(12) United States Patent
Tanigawa et al.

(10) Patent No.: US 12,538,081 B2
(45) Date of Patent: Jan. 27, 2026

(54) SOUND MEASURING DEVICE

(71) Applicant: Panasonic Intellectual Property Corporation of America, Torrance, CA (US)

(72) Inventors: Risako Tanigawa, Osaka (JP); Toshiyuki Matsumura, Osaka (JP); Yuki Terashima, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 205 days.

(21) Appl. No.: 18/221,624

(22) Filed: Jul. 13, 2023

(65) Prior Publication Data

US 2023/0362552 A1 Nov. 9, 2023

Related U.S. Application Data

(63) Continuation of application No. PCT/JP2022/000020, filed on Jan. 4, 2022.

(30) Foreign Application Priority Data

Feb. 1, 2021 (JP) ................................ 2021-014441

(51) Int. Cl.
  *H04R 23/00* (2006.01)
(52) U.S. Cl.
  CPC .................................. *H04R 23/008* (2013.01)
(58) Field of Classification Search
  CPC .. H04R 23/008; G01H 9/00–008; G01H 3/00; G10K 15/00–12
  See application file for complete search history.

(56) References Cited

U.S. PATENT DOCUMENTS

2011/0123199 A1  5/2011  Hashimoto et al.

FOREIGN PATENT DOCUMENTS

| DE | 102014012364 A1 * | 2/2016 | ............... G01N 9/00 |
| JP | S60194699 A * | 10/1985 | ........... G10K 11/025 |
| JP | 2003-230196 | 8/2003 | |
| JP | 2004-279259 | 10/2004 | |
| JP | 2005-318456 | 11/2005 | |

(Continued)

OTHER PUBLICATIONS

English machine translation of DE-102014012364-A1 (Wagner et al.; Inertia-free acousto-optical analog-to-digital converter (ADC) for determining the density or density fluctuations of gases and devices for processing optical signals; published Feb. 2016) (Year: 2016).*

(Continued)

*Primary Examiner* — Mark Fischer
(74) *Attorney, Agent, or Firm* — WENDEROTH, LIND & PONACK, L.L.P.

(57) ABSTRACT

A sound measuring device includes: a light source that emits a laser beam; a frame including at least one reflective surface that faces a predetermined space through which sound travels, and transversely surrounds the predetermined space with respect to a sound propagation direction; and a light receiver that receives the laser beam multiply reflected by the at least one reflective surface. The at least one reflective surface is disposed to multiply reflect and cross the laser beam in the predetermined space as viewed from the sound propagation direction.

13 Claims, 15 Drawing Sheets

(56) References Cited

FOREIGN PATENT DOCUMENTS

| JP | 2006-50099 | | 2/2006 |
|---|---|---|---|
| JP | 2006067219 A | * | 3/2006 |
| WO | 2010/116398 | | 10/2010 |

OTHER PUBLICATIONS

English machine translation of JP-2005318456-A (Arai, Akira; Optical Microphone; published Nov. 2005) (Year: 2005).*
English machine translation of JP-2006067219-A (Arai, Akira; Optical Microphone; published Mar. 2006) (Year: 2006).*
English machine translation of JP-S60194699-A (Inoue et al.; Ultrasonic Sensor; published Oct. 1985) (Year: 1985).*
International Search Report issued Feb. 15, 2022 in International (PCT) Application No. PCT/JP2022/000020.
Nakamura, Kentaro et al., "Measurements of Air-Borne Ultrasound by Detecting the Modulation in Optical Refractive Index of Air", IEEE Ultrasonics Symposium, Munich, Germany, 2002, pp. 609-612.
Hirayama, Manabu, "Kuuki no Kussetsuritsu Hencho wo Kogakuteki ni Kenshutsu suru Cho-shikousei Microphone (Super Directional Microphone that Optically Detects Modulation of Refractive Index in Air)", Interdisciplinary Graduate School of Science & Engineering, Tokyo Institute of Technology, Feb. 2003, pp. 1-73, with partial English translation.
Sonoda, Yoshito, et al., "Development of Optical Wave Microphone and Application to Plasma Diagnostics", Journal of Plasma and Fusion Research, vol. 91, No. 10, Oct. 2015, pp. 641-647, with partial English translation.

* cited by examiner

SOUND MEASURING DEVICE

CROSS REFERENCE TO RELATED APPLICATIONS

This is a continuation application of PCT International Application No. PCT/JP2022/000020 filed on Jan. 4, 2022, designating the United States of America, which is based on and claims priority of Japanese Patent Application No. 2021-014441 filed on Feb. 1, 2021. The entire disclosures of the above-identified applications, including the specifications, drawings and claims are incorporated herein by reference in their entirety.

FIELD

The present disclosure relates to a sound measuring device.

BACKGROUND

A diaphragm microphone that converts micro vibration of a diaphragm excited by sound waves incident on the diaphragm into an electrical signal has been known as a device for collecting sound waves propagating in the air and converting the sound waves into an electrical signal. Unfortunately, the diaphragm microphone is difficult to detect sound having a frequency greater than or equal to the mechanical resonance frequency of the diaphragm, and thus the upper limit of the frequency band of detectable sound is limited to approximately 100 kHz.

Another known device is an optical microphone that measures high-speed micro vibration using light as represented by a laser beam. For example, Patent Literature (PTL) 1 discloses a sound collecting system that measures a sound pressure by directly emitting a laser beam to a sound field and directly capturing a change in refractive index of air caused by sound waves using a laser Doppler vibrometer. The sound collecting system disclosed in PTL 1 does not use the mechanical resonance of a diaphragm to detect sound, and thus the upper limit of the frequency band of detectable sound easily exceeds 100 kHz.

CITATION LIST

Patent Literature

PTL 1: Japanese Unexamined Patent Application Publication No. 2004-279259

SUMMARY

Technical Problem

Unfortunately, the sound collecting system disclosed in PTL 1 is low sensitive to a sound pressure.

In view of this, the present disclosure provides a sound measuring device having improved sensitivity to a sound pressure.

Solution to Problem

A sound measuring device according to one aspect of the present disclosure includes: a light source that emits a laser beam; a frame including at least one reflective surface that faces a predetermined space through which sound travels, and transversely surrounds the predetermined space with respect to a sound propagation direction; and a light receiver that receives the laser beam multiply reflected by the at least one reflective surface, in which the at least one reflective surface is disposed to multiply reflect and cross the laser beam in the predetermined space as viewed from the sound propagation direction.

Advantageous Effects

The present disclosure can provide a sound measuring device having improved sensitivity to a sound pressure.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENT

Underlying Knowledge Leading to the Present Disclosure

In recent years, a technique for detecting inaudible sound which cannot be detected by human hearing has been applied to detection or prediction of a failure in a device or the like. The inaudible sound is ultrasonic sound less likely to be influenced by audible sound, and thus a failure in a device can be detected earlier than the audible sound.

However, the ultrasonic sound of 100 kHz or more cannot be detected by a diaphragm microphone, and thus the application of an optical microphone is expected. The optical microphone does not use the mechanical resonance of a diaphragm to detect sound, and thus the ultrasonic sound of 100 kHz or more can be detected. However, the optical microphone is low sensitive to a sound pressure in comparison with the diaphragm microphone. For example, sound less than 80 dB cannot be detected sometimes.

Figure 1:
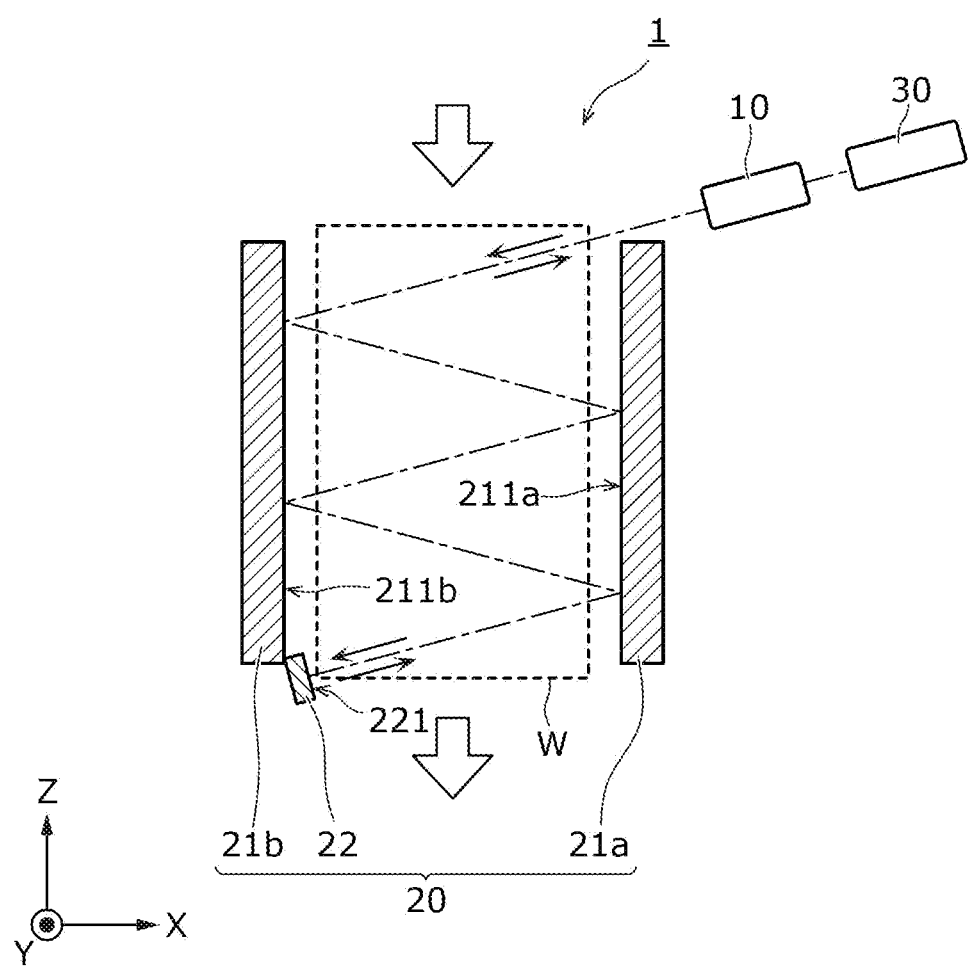
FIG. 1 is a diagram illustrating an example of the configuration of a conventional optical microphone.

The following describes an example of a conventional optical microphone with reference to FIG. 1. FIG. 1 is a diagram illustrating an example of the configuration of the conventional optical microphone. Optical microphone 1 shown in FIG. 1 has the same configuration as the sound collecting system disclosed in PTL 1. FIG. 1 shows the schematic sectional view of frame 20 taken through the ZX plane. Optical microphone 1 includes, for example, laser Doppler vibrometer 10, frame 20 including a pair of reflectors 21a and 21b and angle-adjustment reflector 22, and calculator 30. Reflectors 21a and 21b have reflective surfaces 211a and 211b that face predetermined space W through which sound travels (i.e., predetermined space W in the sound field), respectively. Note that the sound propagation direction is denoted by an open arrow, but may be along the Y-axis. Laser Doppler vibrometer 10 emits a laser beam to predetermined space W and observes the Doppler shift due to the interference between a reference beam and the laser beam reflected back from predetermined space W, to measure a sound pressure in predetermined space W based on a phase shift of the laser beam due to a change in refractive index of air. In doing so, as shown in FIG. 1, the laser beam is reflected multiple times (i.e., multiply reflected) between reflectors 21a and 21b, and the multiply reflected laser beam is further reflected from reflective surface 221 of angle-adjustment reflector 22 back to laser Doppler vibrometer 10.

An increase in the optical path length of the laser beam in the sound field is considered effective to improve the sound pressure sensitivity of optical microphone 1. However, when predetermined space W is enlarged to increase the optical path length, the sound pressure sensitivity of optical microphone 1 may decrease since the laser beam is affected by both the positive and negative pressures of a sound wave. For example, in optical microphone 1 shown in FIG. 1, predetermined space W can be enlarged by increasing the distance between parallel reflectors 21a and 21b and enlarging reflectors 21a and 21b in the vertical or horizontal direction. However, the enlargement of predetermined space W may lead to a decrease in the sound pressure sensitivity since predetermined space W includes both the positive and negative pressures of a sound wave. Moreover, for example, although optical microphone 1 can decrease the incident angle of the laser beam to cause the laser beam to be multiply reflected so that the optical path length of the laser beam increases, the sound pressure sensitivity may decrease since even for little vibration the laser beam easily hits the edge of the reflector.

In view of this, as a result of the earnest study of the inventors of the present application, it is found that the optical path length of the laser beam in predetermined space W can be increased without enlarging predetermined space W. With this, it is found that a sound measuring device (i.e., the optical microphone) having improved sensitivity to a sound pressure can be achieved.

Accordingly, the present disclosure can provide a sound measuring device having improved sensitivity to a sound pressure.

Outline of Disclosure

The outline of one aspect of the present disclosure is described below.

A sound measuring device according to one aspect of the present disclosure includes: a light source that emits a laser beam; a frame including at least one reflective surface that faces a predetermined space through which sound travels, and transversely surrounds the predetermined space with respect to a sound propagation direction; and a light receiver that receives the laser beam multiply reflected by the at least one reflective surface, in which the at least one reflective surface is disposed to multiply reflect and cross the laser beam in the predetermined space as viewed from the sound propagation direction.

With this, the sound measuring device can increase the optical path length of the laser beam in the predetermined space, and thus the sound pressure sensitivity is improved.

For example, in the sound measuring device according to one aspect of the present disclosure, the at least one reflective surface may be formed by at least one recessed surface or planar surface.

With this, the sound measuring device can easily adjust the optical path length of the laser beam in the predetermined space to a desired length. For example, the sound measuring device also can adjust the optical path length of the laser beam and the size of the predetermined space according to the placement area of the sound measuring device, the size of the placement area, or the property (e.g., the frequency, or the sound pressure) of sound to be measured.

For example, in the sound measuring device according to one aspect of the present disclosure, the at least one reflective surface may be integrally formed as a continuous surface.

With this, the sound measuring device can have smooth reflective surfaces integrally formed as a continuous surface, and thus it is possible to increase the area where the laser beam can be reflected. Accordingly, the sound measuring device allows a user to easily design the optical path of the laser beam, and thus it is possible to reduce a loss caused by spillover of the laser beam at the reflective surface.

For example, in the sound measuring device according to one aspect of the present disclosure, the at least one reflective surface may comprise a plurality of reflective surfaces that differ in orientation from each other in the predetermined space.

With this, the sound measuring device can reflect and cross the laser beam in different directions in the predetermined space, and thus it is possible to easily increase the optical path length in the predetermined space.

For example, in the sound measuring device according to one aspect of the present disclosure, a shape of the frame may be a polygon with at least three sides when viewed from the sound propagation direction.

With this, in the sound measuring device, the size or shape of the predetermined space, the optical path length of the laser beam, or the like can be appropriately determined according to, for example, the placement area of the sound measuring device, the size of the placement area, or the property of sound to be measured, and thus it is possible to more appropriately measure the sound.

For example, in the sound measuring device according to one aspect of the present disclosure, the polygon may be a triangle, a quadrilateral, a pentagon, or a hexagon.

With this, the sound measuring device can appropriately reflect the laser beam to appropriately measure the sound.

For example, in the sound measuring device according to one aspect of the present disclosure, the frame may include at least one reflective component, the at least one reflective component may comprise a plurality of reflective components, and the plurality of reflective components may be away from each other.

With this, the sound measuring device can easily adjust the placement angles of the reflective components. Accordingly, the sound measuring device can easily adjust the optical path length of the laser beam in the predetermined space.

For example, in the sound measuring device according to one aspect of the present disclosure, the frame may include at least one reflective component, and the at least one reflective component may be composed of one reflective component.

With this, the sound measuring device can more easily measure the sound. For example, the sound measuring device is achieved simply by being provided with a frame including one reflective component. Accordingly, unlike a frame including two or more reflective components, it is unnecessary to adjust the relative position between the reflective components.

For example, the sound measuring device according to one aspect of the present disclosure may further include a collimating lens, in which the light source may emit the laser beam to the predetermined space through the collimating lens.

With this, the sound measuring device has the laser beam radius that is less likely to increase while the laser beam is multiply reflected in the predetermined space, and thus the laser beam is less likely to spill over the reflective surface. Accordingly, the sound measuring device can reduce a loss of the laser beam, and thus the sound pressure sensitivity is improved.

For example, the sound measuring device according to one aspect of the present disclosure may further include at least one angle-adjustment reflective component capable of reflecting the laser beam and adjusting a reflection angle of the laser beam.

With this, the sound measuring device can adjust the reflection angle of the laser beam to adjust the optical path length of the laser beam.

For example, in the sound measuring device according to one aspect of the present disclosure, the at least one angle-adjustment reflective component may be separate from the frame.

With this, the sound measuring device can finely adjust the reflection angle of the laser beam to finely adjust the optical path length of the laser beam.

For example, in the sound measuring device according to one aspect of the present disclosure, the at least one angle-adjustment reflective component may be fixed to the frame.

With this, the sound measuring device can stabilize the reflection angle of the laser beam without shaking. Moreover, the configuration is simplified.

Note that these general or specific aspects may be realized by a system, a method, a device, an integrated circuit, a computer program, or a non-transitory computer-readable recording medium such as a compact disc read only memory (CD-ROM), or by any combination of systems, methods, devices, integrated circuits, computer programs, and recording media.

Hereinafter, an embodiment according to the present disclosure is described in detail with reference to the drawings. The numerical values, shapes, materials, structural components, the arrangement and connection of the structural components, steps, the order of the steps, etc., indicated in the following embodiment are mere examples, and therefore do not limit the scope of the claims. Moreover, among the structural components in the embodiment, structural components not recited in the independent claim are described as arbitrary structural components. Moreover, each of the drawings is not always illustrated precisely. Throughout the drawings, substantially the same components are assigned with the same numerical references, and overlapping descriptions are omitted or simplified.

Moreover, in the present disclosure, a term indicating a relationship between elements such as parallel and vertical, a term indicating the shape of an element such as rectangle, and a numerical value are not expressions representing only strict meanings. These also mean a substantially equivalent range, e.g., a few percent of difference is included.

Embodiment

Hereinafter, an embodiment is described in detail with reference to the drawings.

1. Configuration

Figure 2:
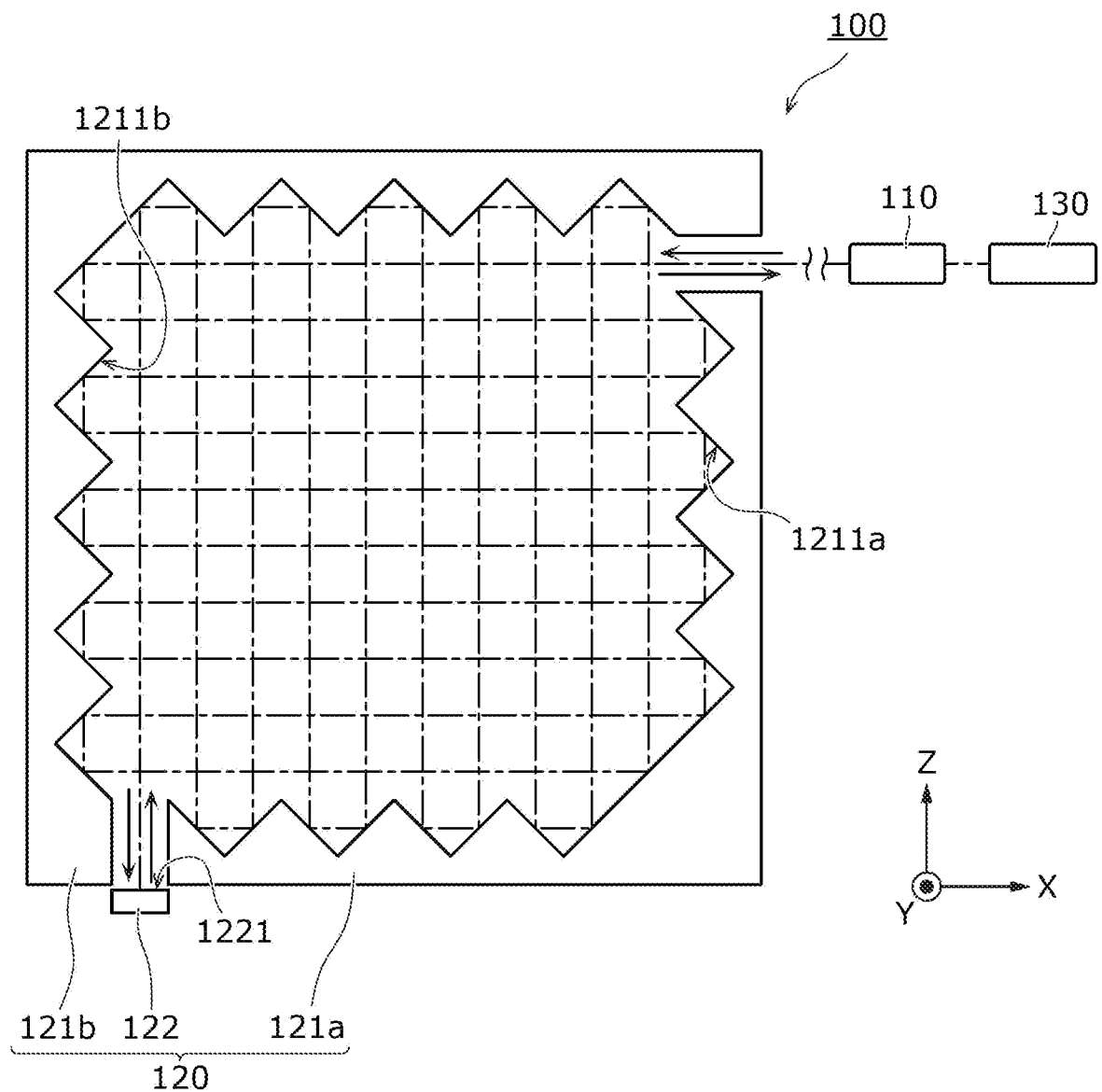
FIG. 2 is a diagram illustrating an example of the configuration of a sound measuring device according to an embodiment.
Figure 3:
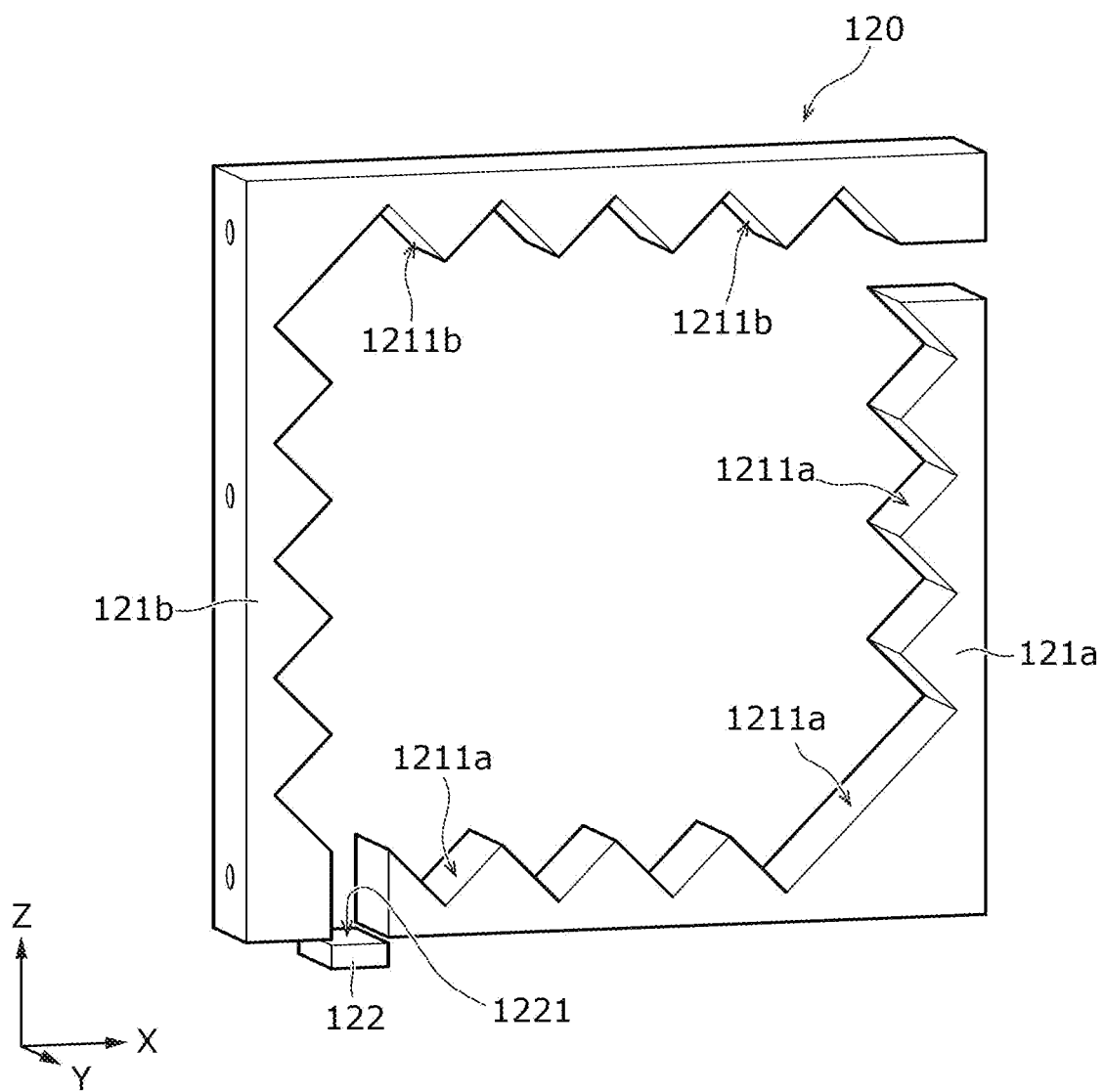
FIG. 3 is a perspective view of the frame shown in FIG. 2.

First, the configuration of a sound measuring device according to an embodiment is described. FIG. 2 is a diagram illustrating an example of the configuration of sound measuring device 100 according to the embodiment. FIG. 3 is a perspective view of frame 120 shown in FIG. 2.

As shown in FIG. 2, sound measuring device 100 includes, for example, meter 110, frame 120, and calculator 130. Each unit is described below.

[Frame 120]

Frame 120 includes at least one reflective component that transversely surrounds a predetermined space, through which sound travels, with respect to the sound propagation direction. In the example shown in FIG. 2 and FIG. 3, sound measuring device 100 measures sound propagating from the positive side of Y-axis toward the ZX plane. To transversely surround the predetermined space with respect to the sound propagation direction means not only that the predetermined space is completely surrounded, but also that the predetermined space is partially surrounded by at least one reflective component. Moreover, for a pair of parallel reflective components, this also means that the predetermined space is sandwiched between the pair of reflective components.

Frame 120 according to the embodiment includes two reflective components 121a and 121b which are away from each other. In this case, frame 120 may have at least one gap between two reflective components 121a and 121b. The at least one gap comprises, for example, a gap through which the laser beam enters the predetermined space (hereinafter, also referred to as an inlet), and a gap for adjusting the reflection angle of the laser beam to return the laser beam back to the inlet (hereinafter, also referred to as an angle adjustment aperture). Frame 120 may have angle-adjustment reflective component 122 inside the angle adjustment aperture or outside the angle adjustment aperture (the negative side of the z-axis). Angle-adjustment reflective component 122 has reflective surface 1221 which faces the predetermined space. For example, angle-adjustment reflective component 122 may be rotatably attached to a support shaft (not shown) fixed to two reflective components 121a and 121b, or be supported by a piezoelectric body in a tilting manner. With this, angle-adjustment reflective component 122 can adjust the reflection angle of the laser beam with respect to reflective surface 1221, and thus it is possible to precisely return the laser beam back to meter 110.

When viewed from the sound propagation direction, the shape of frame 120 may be a triangle, a quadrilateral, a pentagon, a hexagon, a circle, or an ellipse. In the disclosure, the shape of frame 120 is a quadrilateral.

The size of frame 120 may be appropriately determined according to the design. For example, the width (the length in the x-axis) and the height (the length in the z-axis) may be each 130 mm, and the depth (the length in the y-axis) may be 20 mm.

Two reflective components 121a and 121b each have at least one reflective surface. For example, as shown in FIG. 3, two reflective components 121a and 121b each have multiple reflective surfaces 1211a and 1211b which face the predetermined space. More specifically, two reflective surfaces 1211a and 1211b are disposed to multiply reflect and cross the laser beam in the predetermined space as viewed from the sound propagation direction (i.e., the y-axis direction). For example, multiple reflective surfaces 1211a are each flat and are integrally formed as a continuous surface. Furthermore, multiple reflective surfaces 1211a differ in orientation from each other in the predetermined space. Multiple reflective surfaces 1211a may also differ in the shape and the size. For example, the shape of reflective surface 1211a may be a square, a rectangle, or a trapezoid. The size of reflective surface 1211a may differ depending on the location (e.g., the corner, the edge, or the like) of reflective surface 1211a in reflective component 121a. Note that the same is applied to multiple reflective surfaces 1211b.

Any two adjacent ones of multiple reflective surfaces 1211a of reflective component 121a form a protrusion or a recess. In this case, the angle between the two adjacent reflective surfaces 1211a may be a right angle (tolerance: ±0.01). Moreover, multiple reflective surfaces 1211a are each flat. In this case, it is desirable that each reflective surface 1211a has surface accuracy of 4A or less. It is also desirable that each reflective surface 1211a has reflectance of 90% or more for the wave length of the used laser beam. Note that the same is applied to multiple reflective surfaces 1211b.

Note that multiple reflective surfaces 1211a are integrally formed as a continuous surface, but that is not necessary.

For example, when multiple reflective surfaces 1211a are integrally formed as a continuous surface, reflective component 121a may be manufactured by making a base (or a substrate) of a base material such as a glass, a metal, a ceramic, or a resin, and forming a metal reflective film, a high reflective film, a dielectric monolayer film, a dielectric multilayer film, a protective film, or the like on multiple surfaces which result in multiple reflective surfaces 1211a. For example, the base (or the substrate) may be made using a known method of manufacturing a frame or the like. The metal reflective film is a film for reflecting a laser beam, and is made of a metal material such as silver or aluminum. The high reflective film may include a dielectric multilayer film, and be formed on the metal reflective film. The protective film is formed on the metal reflective film, and physically and scientifically protects the metal reflective film. Alternatively, reflective component 121a may be manufactured by mirror-like finishing a metal such as aluminum, stainless, brass, iron, or titanium.

In contrast, when multiple reflective surfaces 1211a are not integrally formed as a continuous surface, reflective component 121a may be manufactured by putting a reflective plate on multiple surfaces which result in multiple reflective surfaces 1211a. For example, the reflective plate is sufficient as long as the reflective surface has reflectance of 90% or more for the used laser beam, and any other reflective plate is possible. For example, the reflective plate may be a mirror-like finished metal plate or a mirror in which a dielectric thin film or a high reflective metal such as aluminum, gold, or silver is evaporated on a glass base.

Note that multiple reflective surfaces 1211b are also integrally formed as a continuous surface in the same manner as multiple reflective surfaces 1211a, but that is not necessary. In this case, reflective component 121b is also manufactured in the same manner as reflective component 121a.

[Meter 110]

Figure 4:
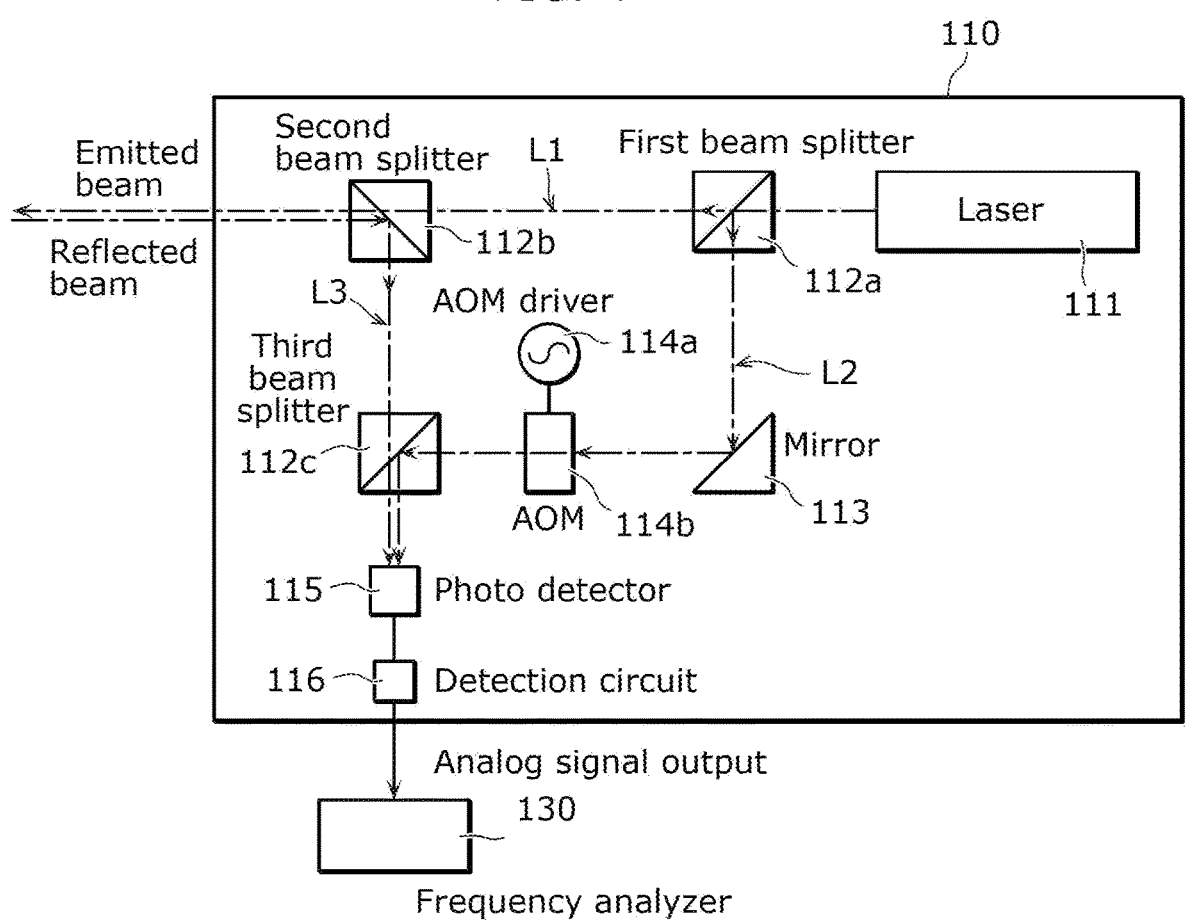
FIG. 4 is a diagram illustrating an example of the configuration of the meter shown in FIG. 2.

Meter 110 emits a laser beam to a predetermined space surrounded by reflective components 121a and 121b, and measures a sound pressure in the predetermined space based on a phase shift of the laser beam reflected from the predetermined space back to meter 110 (hereinafter, also referred to as a reflected beam). For example, meter 110 is a laser Doppler vibrometer or a photo diode. When meter 110 is a laser Doppler vibrometer, meter 110 has the configuration shown in FIG. 4, for example. FIG. 4 is a diagram illustrating an example of the configuration of meter 110 shown in FIG. 2.

As shown in FIG. 4, meter 110 includes light source 111 that emits a laser beam. The laser beam emitted from the light source is split into two directions by first beam splitter 112a. One of two split laser beams L1 (i.e., an emitted beam) is emitted through second beam splitter 112b. On the other hand, the other of two split laser beams L2 formed by first beam splitter 112a is adjusted by mirror 113 to enter Acoust-Optic Modulator (AOM) 114b that is driven by AOM driver 114a, and AOM 114b outputs a reference beam which is a frequency-shifted laser beam. The reference beam is optically adjusted through third beam splitter 112c to enter light receiver 115 (e.g., a photo detector). Moreover, laser beam L3 reflected from the predetermined space back to meter 110 (i.e., reflected beam) enters light receiver 115 through second beam splitter 112b and third beam splitter 112c, and becomes interfering light by overlapping with the reference beam. The interfering light is received by light receiver 115. Meter 110 detects, using detection circuit 116, the phase shift of the laser beam caused by the interference, and outputs the phase shift as an analog signal.

[Calculator 130]

Calculator 130 calculates a sound pressure in the predetermined space based on the signal outputted from meter 110. For example, calculator 130 may be a frequency analyzer.

Note that meter 110 is described as a laser Doppler vibrometer which includes light source 111 and light receiver 115 in one housing, but the present disclosure is not limited to this. Meter 110 may include light source 111 and light receiver 115 in the respective separate housings. Moreover, not only light source 111 and light receiver 115, but also first beam splitter 112a, second beam splitter 112b, third beam splitter 112c, AOM 114b, mirror 113, and the like need not be included in one housing.

Note that light source 111 may be a He—Ne laser transmitter or a laser diode, for example.

[Collimating Lens 140]

Figure 5:
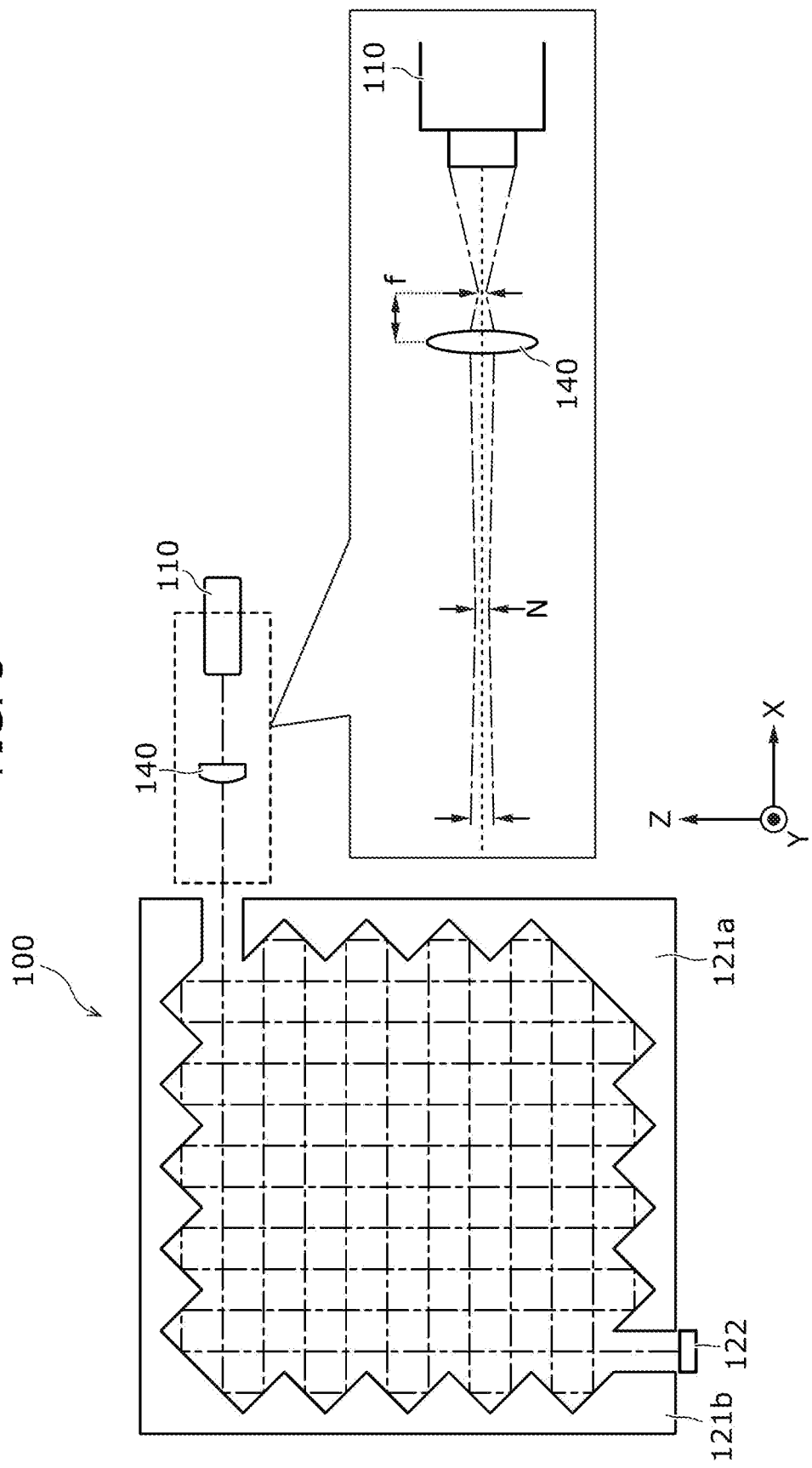
FIG. 5 is a diagram illustrating another example of the configuration of the sound measuring device according to the embodiment.

Sound measuring device 100 may further include collimating lens 140 (see FIG. 5). FIG. 5 is a diagram illustrating another example of the configuration of sound measuring device 100 according to the embodiment.

As shown in FIG. 5, light source 111 (see FIG. 4) emits a laser beam to the predetermined space through collimating lens 140. This prevents a slight increase in the laser beam radius while the laser beam is reflected in the predetermined space, and thus it is possible to reduce spillover of the laser beam at reflective surfaces 1211a and 1211b. Accordingly, a loss of the reflected beam received by meter 110 is reduced, thus improving the sensitivity to a sound pressure in sound measuring device 100.

2. Experimental Examples

The following describes simulations performed on sound measuring device 100 according to the embodiment and the simulation results.

Experimental Example 1

Experimental example 1 uses collimating lenses each having a different focal length, and a focal length and the effect of preventing an increase in the laser beam radius are simulated. The laser beam radius is calculated based on the theory of Gaussian beam propagation. The results are shown in FIG. 6.

Figure 6:
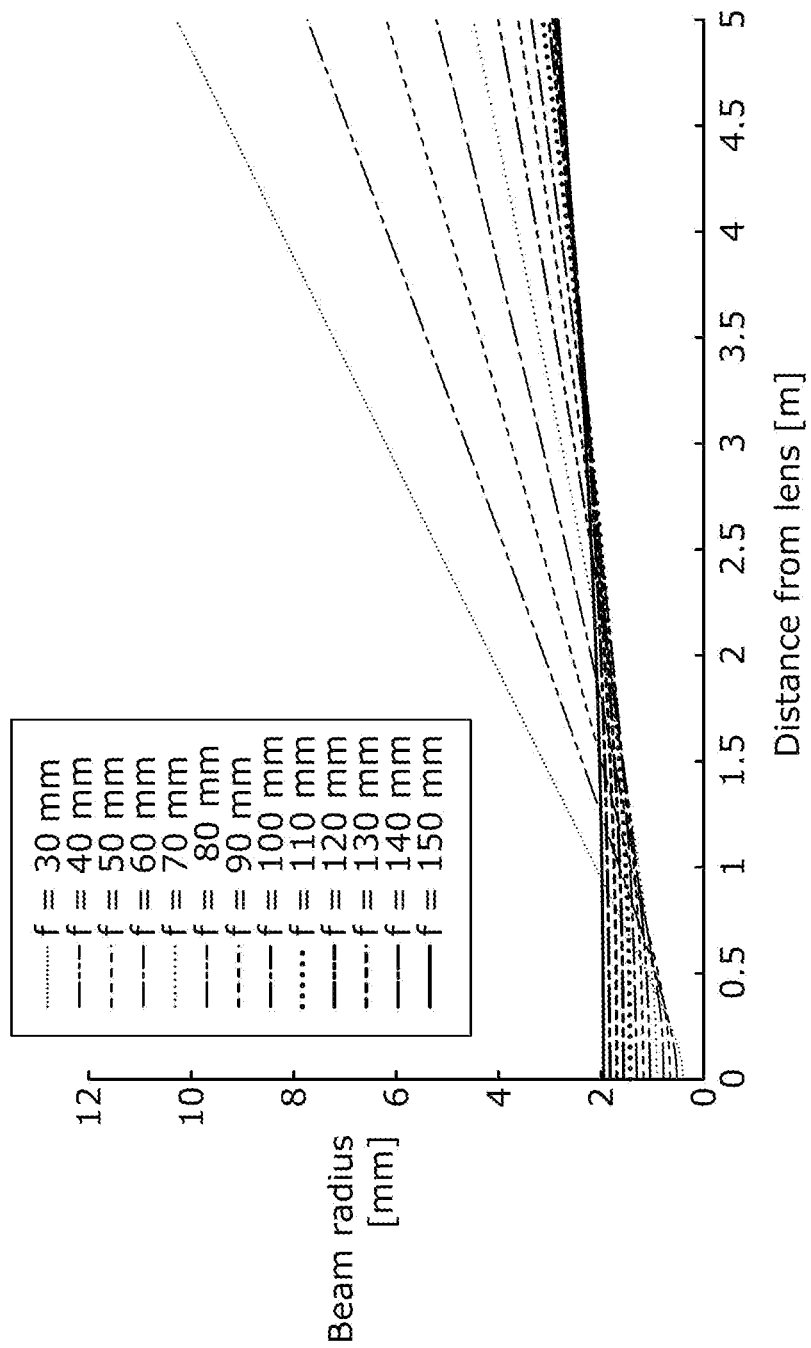
FIG. 6 is a diagram illustrating the results of experimental example 1.

FIG. 6 is a diagram illustrating the results of experimental example 1. FIG. 6 shows, using 13 collimating lenses each having a different focal length, the relationship among focal length f (mm) of each collimating lens, a distance from the collimating lens (i.e., an optical path length) (m), and the beam radius (mm) of the laser beam emitted through the collimating lens.

As shown in FIG. 6, it is found that a distance in which the laser beam maintains parallelism decreases as the focal length decreases. From the simulation results, it is found that an increase in the laser beam radius is reduced in the use of the collimating lens having a focal length of 150 mm and the laser beam maintains parallelism in the optical path length up to the distance of 5 m from the collimating lens.

From the above simulation results, it is confirmed that light source 111 allows a laser beam to maintain parallelism by emitting the laser beam to the predetermined space through collimating lens 140. Accordingly, it is confirmed that sound measuring device 100 can improve the sensitivity to a sound pressure by further including collimating lens 140.

Experimental Example 2

Subsequently, in experimental example 2, the sound pressure sensitivity of the sound measuring device is simulated under the condition that the sound wave is a plane wave. Experimental example 2 uses conventional optical microphone 1 shown in FIG. 1 and sound measuring device 100 shown in FIG. 2.

Optical microphone 1 has an optical path length of 2 m when the laser beam is reflected 10 times between a pair of planar reflective mirrors (reflectors 21a and 21b in FIG. 1).

Sound measuring device 100 has an optical path length of 4 m when the laser beam is multiply reflected between a pair of uneven reflective mirrors (reflective components 121a and 121b in FIG. 2). The results are shown in FIG. 7.

Figure 7:
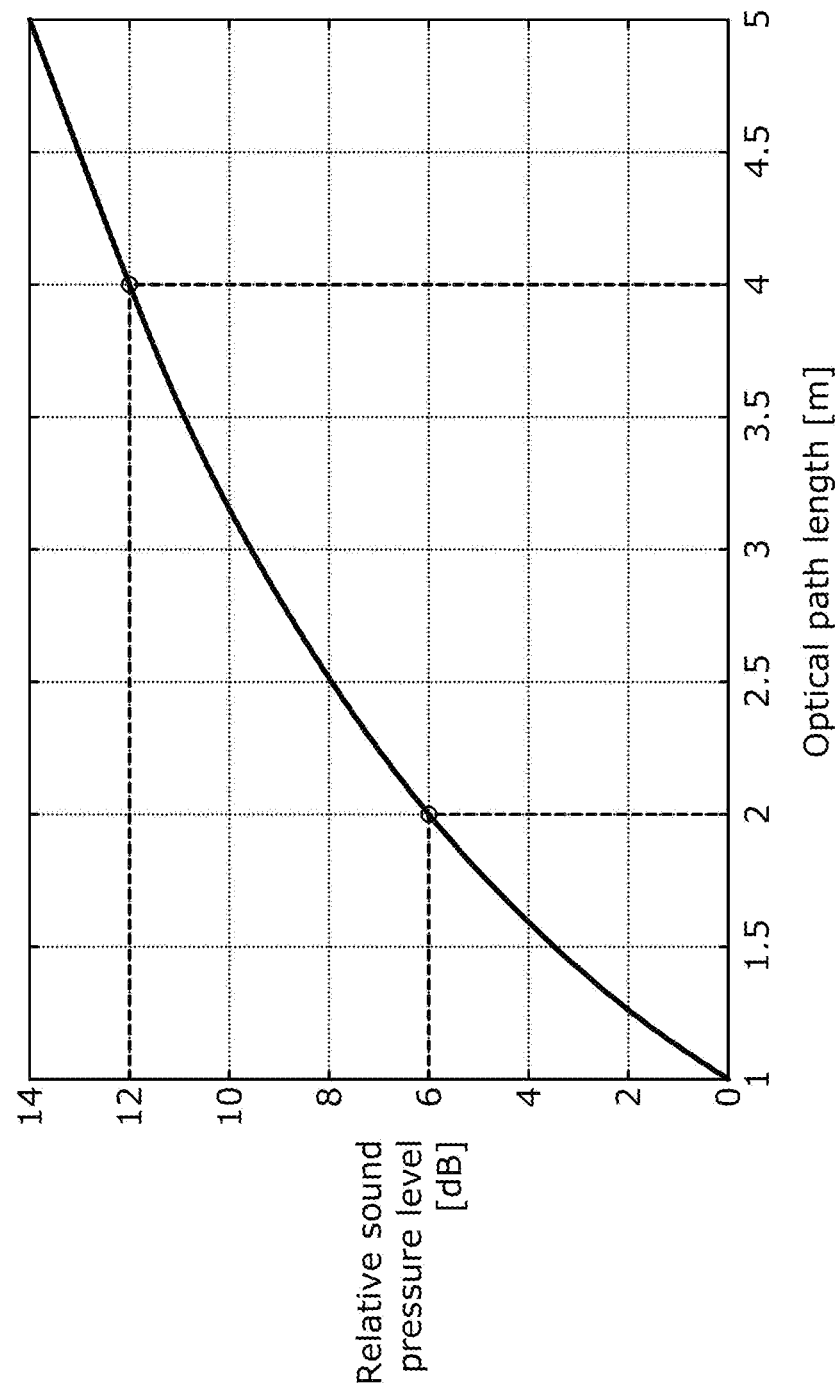
FIG. 7 is a diagram illustrating the results of experimental example 2.

FIG. 7 is a diagram illustrating the results of experimental example 2. FIG. 7 shows a relative sound pressure level (dB) which is a sound pressure level when the sound pressure at the optical path length of 1 m is defined as 0 dB.

As shown in FIG. 7, the relative sound pressure level of the sound measured by optical microphone 1 is 6 dB. The relative sound pressure level of the sound measured by sound measuring device 100 is 12 dB. Accordingly, it is confirmed that sound measuring device 100 according to embodiment 1 has sound pressure sensitivity improved more than that of optical microphone 1.

Experimental Example 3

Subsequently, in Experimental example 3, the sound pressure sensitivity of the sound measuring device is simulated under the condition that the sound wave is a spherical wave. More specifically, assuming that a distance from the sound source to frame 20 or 120 (also referred to as a sound receiver) is 1 m, the sound pressure sensitivity is simulated. Note that the description of experimental example 3 omits the same content as experimental example 2, and focuses on the difference. The results are shown in FIG. 8.

Figure 8:
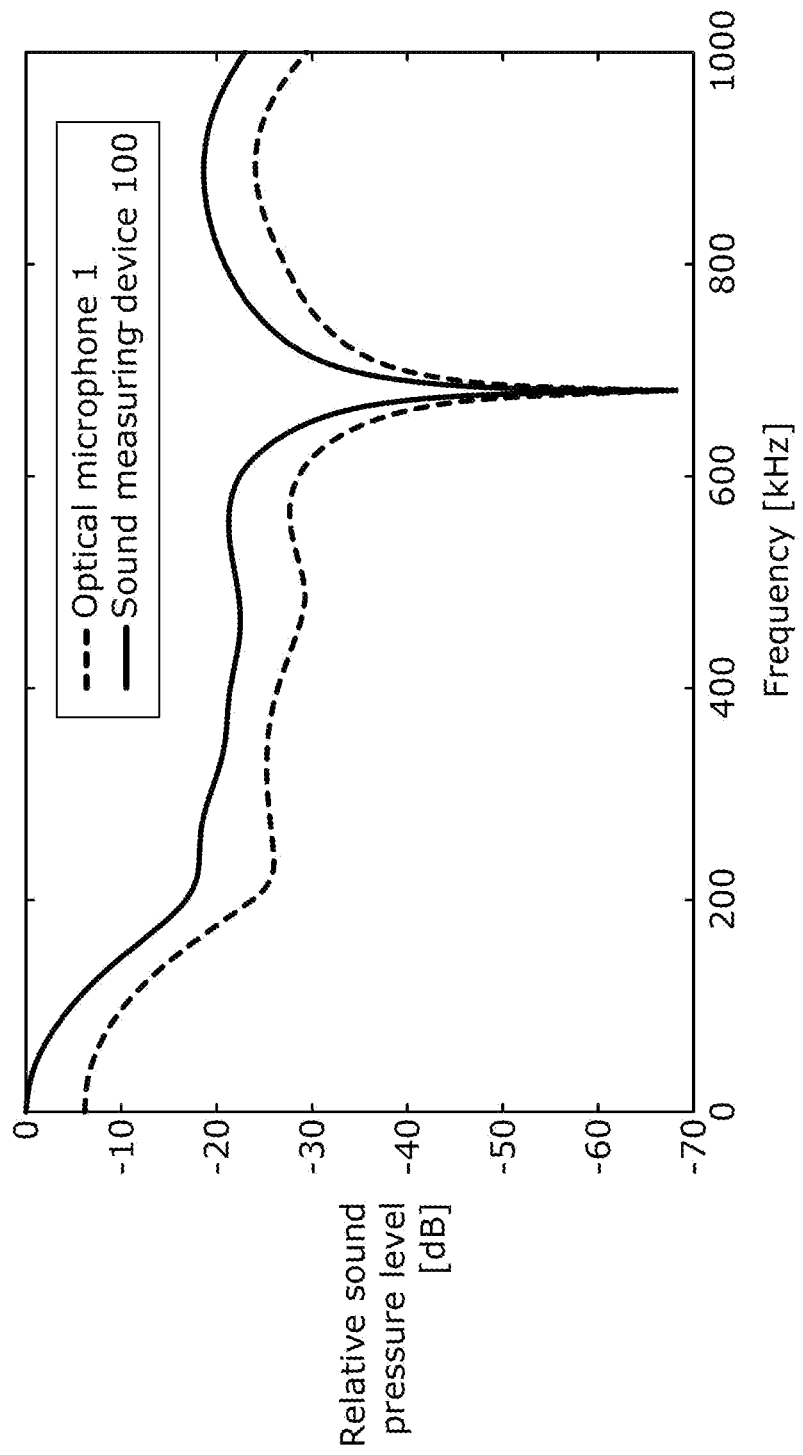
FIG. 8 is a diagram illustrating the results of experimental example 3.

FIG. 8 is a diagram illustrating the results of experimental example 3. FIG. 8 shows a relative sound pressure level (dB) which is a sound pressure level when 0 Hz of sound measuring device 100 is defined as 0 dB. FIG. 8 also shows, with respect to each frequency, the relative sound pressure level of the temporal effective value for the integral of sound pressure on the optical path.

As shown in FIG. 8, the relative sound pressure level of the sound measured by sound measuring device 100 is higher than the relative sound pressure level of the sound measured by optical microphone 1. The maximum difference in relative sound pressure level is 7.93 dB (230 kHz). Accordingly, it is confirmed that sound measuring device 100 according to embodiment 1 has sound pressure sensitivity improved more than that of optical microphone 1.

3. Advantageous Effects, Etc.

As described above, sound measuring device 100 according to the embodiment includes: light source 111 that emits a laser beam; frame 120 including at least one reflective surface 1211a, 1211b that faces a predetermined space through which sound travels, and transversely surrounds the predetermined space with respect to a sound propagation direction; and light receiver 115 that receives the laser beam multiply reflected by at least one reflective surface 1211a, 1211b, in which at least one reflective surface 1211a, 1211b is disposed to multiply reflect and cross the laser beam in the predetermined space as viewed from the sound propagation direction.

With this, sound measuring device 100 can increase the optical path length of the laser beam in the predetermined space, and thus the sound pressure sensitivity is improved.

For example, in sound measuring device 100 according to the embodiment, at least one reflective surface 1211a, 1211b may be formed by at least one recessed surface or planar surface.

With this, sound measuring device 100 can easily adjust the optical path length of the laser beam in the predetermined space to a desired length. For example, sound measuring device 100 also can adjust the optical path length of the laser beam and the size of the predetermined space according to the placement area of sound measuring device 100, the size of the placement area, or the property (e.g., the frequency, or the sound pressure) of sound to be measured.

For example, in sound measuring device 100 according to the embodiment, at least one reflective surface 1211a, 1211b may be integrally formed as a continuous surface.

With this, sound measuring device 100 can have smooth reflective surfaces integrally formed as a continuous surface, and thus it is possible to increase the area where the laser beam can be reflected. Accordingly, sound measuring device 100 allows a user to easily design the optical path of the laser beam, and thus it is possible to reduce a loss caused by spillover of the laser beam at the reflective surface.

For example, in sound measuring device 100 according to the embodiment, at least one reflective surface 1211a, 1211b may comprise a plurality of reflective surfaces that differ in orientation from each other in the predetermined space.

With this, sound measuring device 100 can reflect and cross the laser beam in different directions in the predetermined space, and thus it is possible to easily increase the optical path length in the predetermined space.

For example, in sound measuring device 100 according to the embodiment, a shape of frame 120 may be a polygon with at least three sides when viewed from the sound propagation direction.

With this, in sound measuring device 100, the size or shape of the predetermined space, the optical path length of the laser beam, or the like can be appropriately determined according to, for example, the placement area of sound measuring device 100, the size of the placement area, or the property of sound to be measured, and thus it is possible to more appropriately measure the sound.

For example, in sound measuring device 100 according to the embodiment, the polygon may be a triangle, a quadrilateral, a pentagon, or a hexagon.

With this, sound measuring device 100 can appropriately reflect the laser beam to appropriately measure the sound.

For example, in sound measuring device 100 according to the embodiment, frame 120 may include at least one reflective component 121a, 121b, at least one reflective component 121a, 121b may comprise a plurality of reflective components, and reflective components 121a, 121b may be away from each other.

With this, sound measuring device 100 can easily adjust the placement angles of reflective components 121a and 121b. Accordingly, sound measuring device 100 can easily adjust the optical path length of the laser beam in the predetermined space.

For example, in sound measuring device 100 according to the embodiment, frame 120 may include at least one reflective component 121a, 121b, and at least one reflective component 121a, 121b may be composed of one reflective component.

With this, sound measuring device 100 can more easily measure the sound. For example, sound measuring device 100 is achieved simply by being provided with a frame including one reflective component. Accordingly, unlike a frame including two or more reflective components, it is unnecessary to adjust the relative position between the reflective components.

For example, sound measuring device 100 according to the embodiment may further includes a collimating lens, in which the light source may emit the laser beam to the predetermined space through the collimating lens.

With this, sound measuring device 100 has the laser beam radius that is less likely to increase while the laser beam is multiply reflected in the predetermined space, and thus the laser beam is less likely to spill over the reflective surface. Accordingly, sound measuring device 100 can reduce a loss of the laser beam, and thus the sound pressure sensitivity is improved.

For example, sound measuring device 100 according to the embodiment may further include at least one angle-adjustment reflective component 122 capable of reflecting the laser beam and adjusting a reflection angle of the laser beam.

With this, sound measuring device 100 can adjust the reflection angle of the laser beam to adjust the optical path length of the laser beam.

For example, in sound measuring device 100 according to the embodiment, at least one angle-adjustment reflective component 122 may be separate from frame 120.

With this, sound measuring device 100 can finely adjust the reflection angle of the laser beam to finely adjust the optical path length of the laser beam.

For example, in sound measuring device 100 according to the embodiment, at least one angle-adjustment reflective component 122 may be fixed to frame 120.

With this, sound measuring device 100 can stabilize the reflection angle of the laser beam without shaking. Moreover, the configuration is simplified.

Variation 1

1. Configuration

Figure 9:
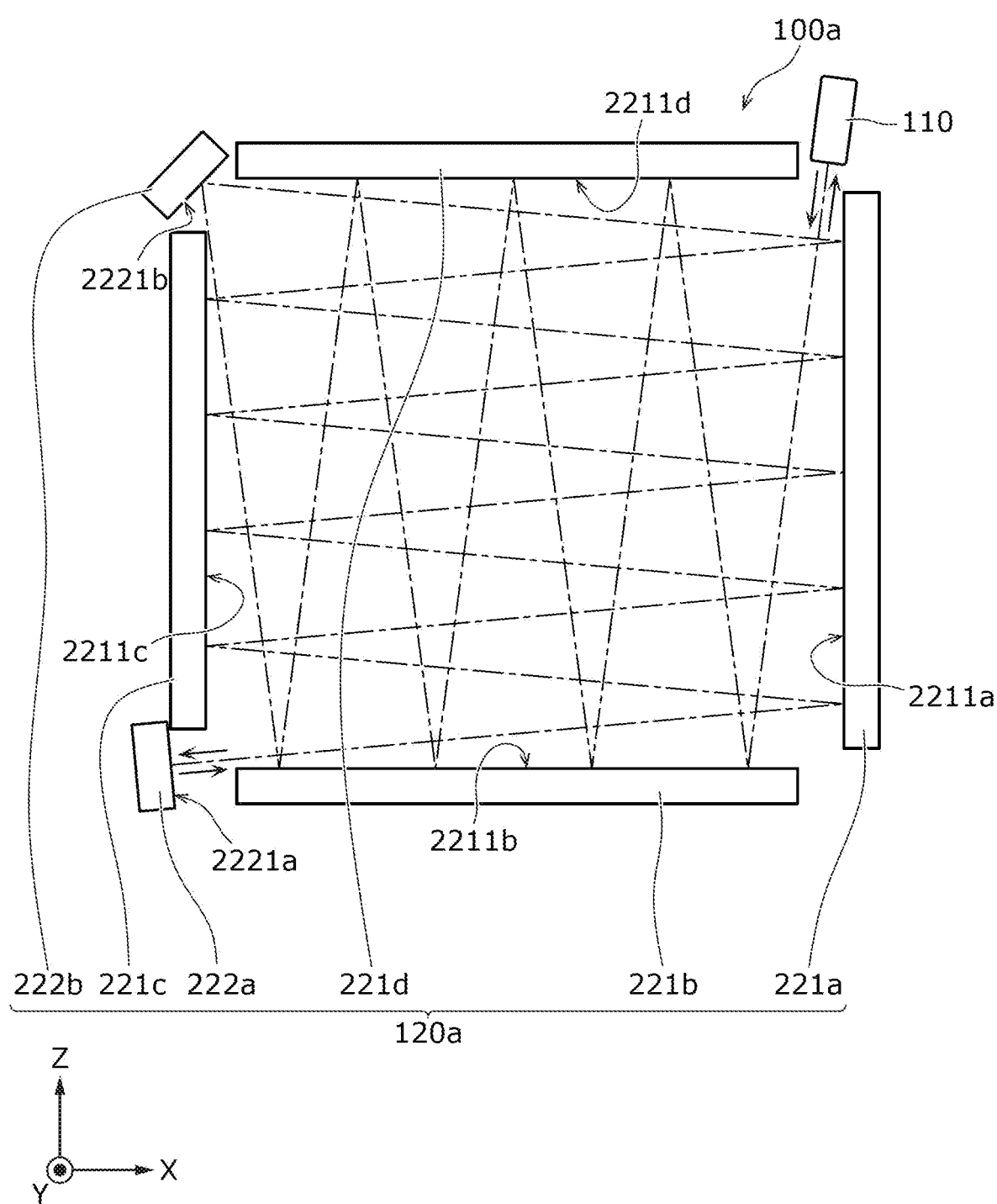
FIG. 9 is a diagram illustrating an example of the configuration of a sound measuring device according to variation 1.

Next, the configuration of a sound measuring device according to variation 1 is described. FIG. 9 is a diagram illustrating an example of the configuration of sound measuring device 100a according to variation 1.

The foregoing has described an example of sound measuring device 100 according to the embodiment that includes two reflective components 121a and 121b each having an uneven reflective surface formed by planar reflective surfaces integrally formed as a continuous surface. Variation 1 is different from the embodiment in that sound measuring device 100a includes four reflective components 221a, 221b, 221c, and 221d each having one planar reflective surface. The following describes differences from the embodiment.

Four reflective components 221a, 221b, 221c, and 221d include reflective surfaces 2211a, 2211b, 2211c, and 2211d, respectively. These reflective surfaces are planar and face the predetermined space.

Moreover, in sound measuring device 100a, reflective component 221a and reflective component 221c are parallel to each other, and reflective component 221b and reflective component 221d are parallel to each other.

Furthermore, frame 120a includes two angle-adjustment reflective components 222a and 222b. Angle-adjustment reflective component 222a adjusts the reflection angle of the laser beam to be reflected at reflective surface 2221a by changing the orientation of reflective surface 2221a. In other words, angle-adjustment reflective component 222a is used to return the laser beam back to meter 110. Moreover, angle-adjustment reflective component 222b reflects the laser beam multiply reflected along the z-axis between the pair of reflective components 221b and 221d, from reflective surface 2221b toward reflective component 221a. With this, the laser beam is multiply reflected along the x-axis between the pair of reflective components 221a and 221c.

With the above configuration, sound measuring device 100a according to variation 1 can multiply reflect the laser beam along the x-axis and the z-axis in the predetermined space, and thus it is possible to increase the optical path length with no change in size of the sound receiver.

Note that each of angle-adjustment reflective components 222a and 222b need not be separate from reflective components 221a to 221d. For example, angle-adjustment reflective component 222a may be fixed to reflective component 221b or reflective component 221c. For example, angle-adjustment reflective component 222b also may be fixed to reflective component 221c or reflective component 221d.

2. Advantageous Effects, Etc.

As described above, sound measuring device 100a according to variation 1 includes: light source 111 that emits a laser beam (see FIG. 4); frame 120a including at least one reflective surface 2211a, 2211b, 2211c, 2211d that faces a predetermined space through which sound travels, and transversely surrounds the predetermined space with respect to a sound propagation direction; and light receiver 115 that receives the laser beam multiply reflected by at least one reflective surface 2211a, 2211b, 2211c, 2211d (see FIG. 4), in which at least one reflective surface 2211a, 2211b, 2211c, 2211d is disposed to multiply reflect and cross the laser beam in the predetermined space as viewed from the sound propagation direction.

With this, sound measuring device 100a can increase the optical path length of the laser beam in the predetermined space, and thus the sound pressure sensitivity is improved.

For example, in sound measuring device 100a according to variation 1, at least one reflective surface 2211a, 2211b, 2211c, 2211d may be formed by at least one recessed surface or planar surface.

With this, sound measuring device 100a can easily adjust the optical path length of the laser beam in the predetermined space to a desired length. For example, sound measuring device 100a also can adjust the optical path length of the laser beam and the size of the predetermined space according to the placement area of sound measuring device 100a, the size of the placement area, or the property (e.g., the frequency, or the sound pressure) of sound to be measured.

For example, in sound measuring device 100a according to variation 1, at least one reflective surface 2211a, 2211b, 2211c, 2211d may be integrally formed as a continuous surface.

With this, sound measuring device 100a can have smooth reflective surfaces integrally formed as a continuous surface, and thus it is possible to increase the area where the laser beam can be reflected. Accordingly, sound measuring device 100a allows a user to easily design the optical path of the laser beam, and thus it is possible to reduce a loss caused by spillover of the laser beam at the reflective surface.

For example, in sound measuring device 100a according to variation 1, at least one reflective surface 2211a, 2211b, 2211c, 2211d may comprise reflective surfaces 2211a, 2211b, 2211c, 2211d that differ in orientation from each other in the predetermined space.

With this, sound measuring device 100a can reflect and cross the laser beam in different directions in the predetermined space, and thus it is possible to easily increase the optical path length in the predetermined space.

For example, in sound measuring device 100a according to variation 1, a shape of frame 120a may be a polygon with at least three sides when viewed from the sound propagation direction.

With this, in sound measuring device 100a, the size or shape of the predetermined space, the optical path length of the laser beam, or the like can be appropriately determined according to, for example, the placement area of sound measuring device 100a, the size of the placement area, or the property of sound to be measured, and thus it is possible to more appropriately measure the sound.

For example, in sound measuring device 100a according to variation 1, the polygon may be a triangle, a quadrilateral, a pentagon, or a hexagon.

With this, sound measuring device 100a can appropriately reflect the laser beam to appropriately measure the sound.

For example, in sound measuring device 100a according to variation 1, frame 120a may include at least one reflective component 221a, 221b, 221c, 221d, at least one reflective component 221a, 221b, 221c, 221d may comprise a plurality of reflective components, and reflective components 221a, 221b, 221c, 221d may be away from each other.

With this, sound measuring device 100a can easily adjust the placement angles of reflective components 221a, 221b, 221c, 221d. Accordingly, sound measuring device 100a can easily adjust the optical path length of the laser beam in the predetermined space.

For example, sound measuring device 100a according to variation 1 may further include at least one angle-adjustment reflective component (222a, 222b) capable of reflecting the laser beam and adjusting a reflection angle of the laser beam.

With this, sound measuring device 100a can adjust the reflection angle of the laser beam to adjust the optical path length of the laser beam.

For example, in sound measuring device 100a according to variation 1, at least one angle-adjustment reflective component (222a, 222b) may be separate from frame 120a.

With this, sound measuring device 100a can finely adjust the reflection angle of the laser beam to finely adjust the optical path length of the laser beam.

For example, in sound measuring device 100a according to variation 1, at least one angle-adjustment reflective component (222a, 222b) may be fixed to frame 120a.

With this, sound measuring device 100a can stabilize the reflection angle of the laser beam without shaking. Moreover, the configuration is simplified.

Variation 2

1. Configuration

Figure 10:
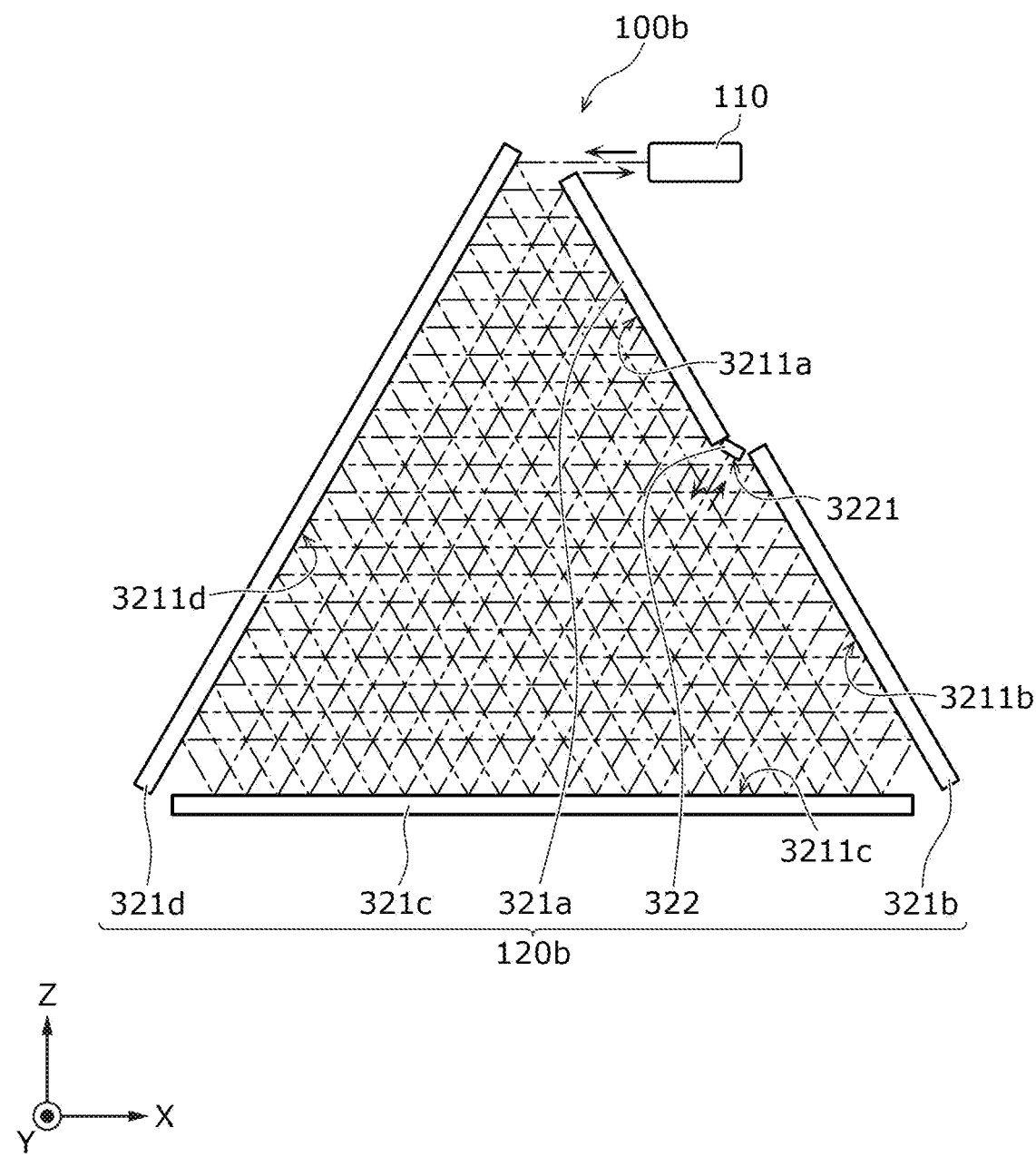
FIG. 10 is a diagram illustrating an example of the configuration of a sound measuring device according to variation 2.

Next, the configuration of a sound measuring device according to variation 2 is described. FIG. 10 is a diagram illustrating an example of the configuration of sound measuring device 100b according to variation 2.

The foregoing has described an example of sound measuring device 100a according to variation 1 that includes four reflective components 221a, 221b, 221c, and 221d each having a planar reflective surface, in which reflective component 221a and reflective component 221c are parallel to each other and reflective component 221a and reflective component 221c are parallel to each other. Variation 2 is different from variation 1 in that sound measuring device 100b includes four reflective components 321a, 321b, 321c, and 321d each having a planar reflective surface which are disposed to triangularly surround the predetermined space when viewed from the sound propagation direction. The following describes differences from the embodiment and variation 1.

Four reflective components 321a, 321b, 321c, and 321d include reflective surfaces 3211a, 3211b, 3211c, and 3211d, respectively. These reflective surfaces are planar and face the predetermined space. Furthermore, frame 120b includes one angle-adjustment reflective component 322. Angle-adjustment reflective component 322 adjusts the reflection angle of the laser beam at reflective surface 3221 by changing the orientation of reflective surface 3221. In other words, angle-adjustment reflective component 322 is used to return the laser beam back to meter 110.

With the above configuration, sound measuring device 100b according to variation 2 can multiply reflect the laser beam in three directions in the predetermined space, and thus it is possible to increase the optical path length with no change in size of the sound receiver.

Note that angle-adjustment reflective component 322 need not be separate from reflective components 321a and 321b. For example, angle-adjustment reflective component 322 may be fixed to reflective component 321a or reflective component 321b.

2. Advantageous Effects, Etc.

As described above, sound measuring device 100b according to variation 2 includes: light source 111 that emits a laser beam (see FIG. 4); frame 120b including at least one reflective surface 3211a, 3211b, 3211c, 3211d that faces a predetermined space through which sound travels, and transversely surrounds the predetermined space with respect to a sound propagation direction; and light receiver 115 that receives the laser beam multiply reflected by at least one reflective surface 3211a, 3211b, 3211c, 3211d (see FIG. 4), in which at least one reflective surface 3211a, 3211b, 3211c, 3211d is disposed to multiply reflect and cross the laser beam in the predetermined space as viewed from the sound propagation direction.

With this, sound measuring device 100b can increase the optical path length of the laser beam in the predetermined space, and thus the sound pressure sensitivity is improved.

For example, in sound measuring device 100b according to variation 2, at least one reflective surface 3211a, 3211b, 3211c, 3211d may be formed by at least one recessed surface or planar surface.

With this, sound measuring device 100b can easily adjust the optical path length of the laser beam in the predetermined space to a desired length. For example, sound measuring device 100b also can adjust the optical path length of the laser beam and the size of the predetermined space according to the placement area of sound measuring device 100b, the size of the placement area, or the property (e.g., the frequency, or the sound pressure) of sound to be measured.

For example, in sound measuring device 100b according to variation 2, at least one reflective surface 3211a, 3211b, 3211c, 3211d may be integrally formed as a continuous surface.

With this, sound measuring device 100b can have smooth reflective surfaces integrally formed as a continuous surface, and thus it is possible to increase the area where the laser beam can be reflected. Accordingly, sound measuring device 100b allows a user to easily design the optical path of the laser beam, and thus it is possible to reduce a loss caused by spillover of the laser beam at the reflective surface.

For example, in sound measuring device 100b according to variation 2, at least one reflective surface 3211a, 3211b, 3211c, 3211d may comprise reflective surfaces 3211a, 3211b, 3211c, 3211d that differ in orientation from each other in the predetermined space.

With this, sound measuring device 100b can reflect and cross the laser beam in different directions in the predetermined space, and thus it is possible to easily increase the optical path length in the predetermined space.

For example, in sound measuring device 100b according to variation 2, a shape of frame 120b may be a polygon with at least three sides when viewed from the sound propagation direction.

With this, in sound measuring device 100b, the size or shape of the predetermined space, the optical path length of the laser beam, or the like can be appropriately determined according to, for example, the placement area of sound measuring device 100b, the size of the placement area, or the property of sound to be measured, and thus it is possible to more appropriately measure the sound.

For example, in sound measuring device 100b according to variation 2, frame 120b may include at least one reflective component 321a, 321b, 321c, 321d, at least one reflective component 321a, 321b, 321c, 321d may comprise a plurality of reflective components, and reflective components 321a, 321b, 321c, 321d may be away from each other.

With this, sound measuring device 100b can easily adjust the placement angles of reflective components 321a, 321b, 321c, 321d. Accordingly, sound measuring device 100b can easily adjust the optical path length of the laser beam in the predetermined space.

For example, sound measuring device 100b according to variation 2 may further include at least one angle-adjustment reflective component 322 capable of reflecting the laser beam and adjusting a reflection angle of the laser beam.

With this, sound measuring device 100b can adjust the reflection angle of the laser beam to adjust the optical path length of the laser beam.

For example, in sound measuring device 100b according to variation 2, at least one angle-adjustment reflective component 322 may be separate from frame 120b.

With this, sound measuring device 100b can finely adjust the reflection angle of the laser beam to finely adjust the optical path length of the laser beam.

For example, in sound measuring device 100b according to variation 2, at least one angle-adjustment reflective component 322 may be fixed to frame 120b.

With this, sound measuring device 100b can stabilize the reflection angle of the laser beam without shaking. Moreover, the configuration is simplified.

Variation 3

1. Configuration

Figure 11:
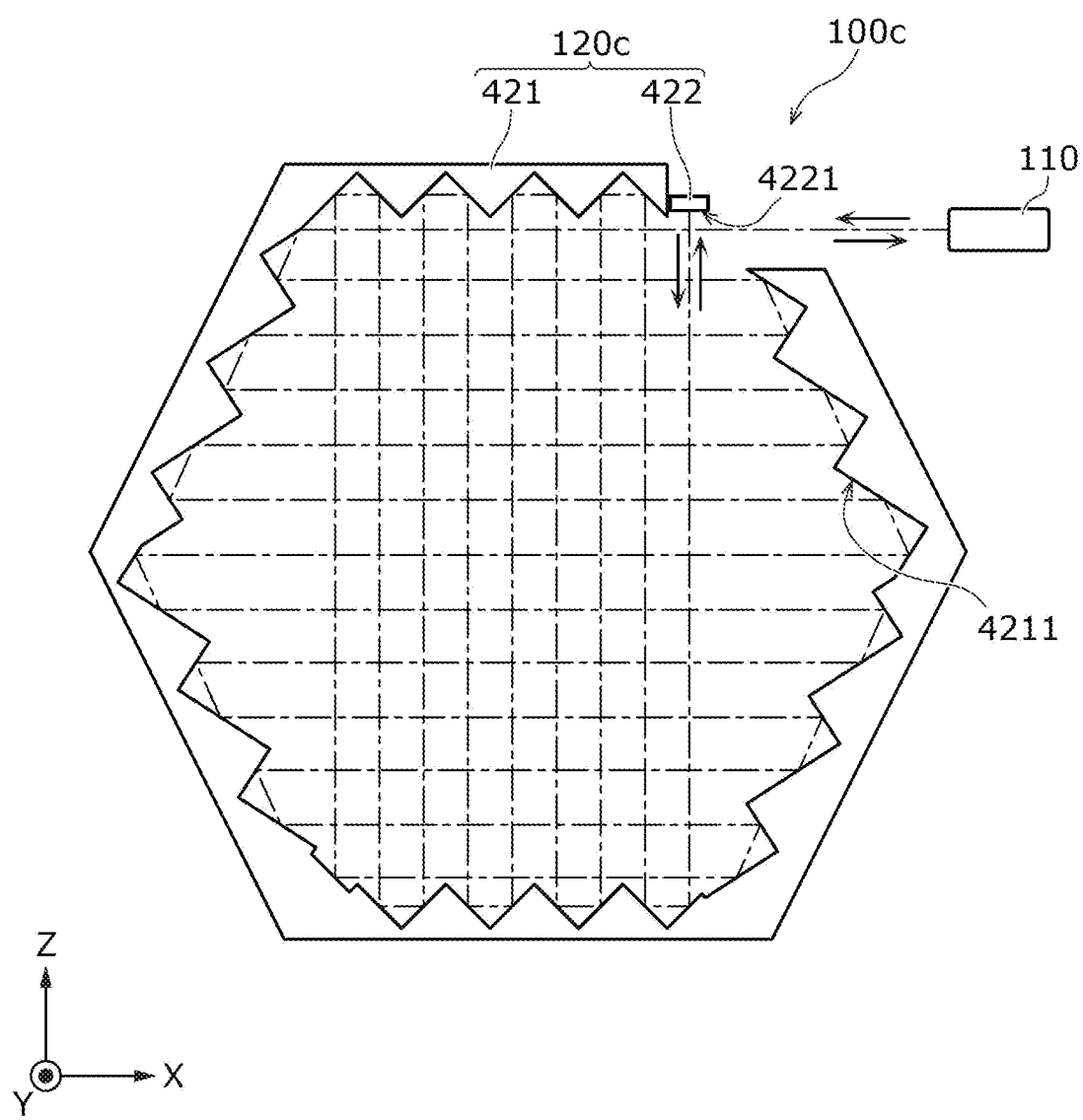
FIG. 11 is a diagram illustrating an example of the configuration of a sound measuring device according to variation 3.

Next, the configuration of a sound measuring device according to variation 3 is described. FIG. 11 is a diagram illustrating an example of the configuration of sound measuring device 100c according to variation 3.

The foregoing has described an example of sound measuring device 100b according to variation 2 that includes four reflective components 321a, 321b, 321c, and 321d each having a planar reflective surface, in which reflective components 321a, 321b, 321c, and 321d are disposed to triangularly surround the predetermined space when viewed from the sound propagation direction. Variation 3 is different from the embodiment, variation 1, and variation 2 in that sound measuring device 100c according to variation 3 includes one reflective component 421 having an uneven reflective surface formed by planar reflective surfaces integrally formed as a continuous surface, in which the shape of frame 120c is a hexagon when viewed from the sound propagation direction. The following describes differences from the embodiment, variation 1, and variation 2.

Reflective component 421 includes multiple reflective surfaces 4211. These reflective surfaces are planar and integrally formed as a continuous surface. Furthermore, frame 120c includes one angle-adjustment reflective component 422. Angle-adjustment reflective component 422 adjusts the reflection angle of the laser beam at reflective surface 4221 by changing the orientation of reflective surface 4221. In other words, angle-adjustment reflective component 422 is used to return the laser beam back to meter 110.

With the above configuration, sound measuring device 100c according to variation 3 can multiply reflect the laser beam in various directions in the predetermined space, and thus it is possible to increase the optical path length with no change in size of the sound receiver.

Note that angle-adjustment reflective component 422 need not be separate from reflective component 421. For example, angle-adjustment reflective component 422 may be fixed to reflective component 421.

2. Advantageous Effects, Etc.

As described above, sound measuring device 100c according to variation 3 includes: light source 111 that emits a laser beam (see FIG. 4); frame 120c including at least one reflective surface 4211 that faces a predetermined space through which sound travels, and transversely surrounds the predetermined space with respect to a sound propagation direction; and light receiver 115 that receives the laser beam multiply reflected by at least one reflective surface 4211 (see FIG. 4), in which at least one reflective surface 4211 is disposed to multiply reflect and cross the laser beam in the predetermined space as viewed from the sound propagation direction.

With this, sound measuring device 100c can increase the optical path length of the laser beam in the predetermined space, and thus the sound pressure sensitivity is improved.

For example, in sound measuring device 100c according to variation 3, at least one reflective surface 4211 may be formed by at least one recessed surface or planar surface.

With this, sound measuring device 100c can easily adjust the optical path length of the laser beam in the predetermined space to a desired length. For example, sound measuring device 100c also can adjust the optical path length of the laser beam and the size of the predetermined space according to the placement area of sound measuring device 100c, the size of the placement area, or the property (e.g., the frequency, or the sound pressure) of sound to be measured.

For example, in sound measuring device 100c according to variation 3, at least one reflective surface 4211 may be integrally formed as a continuous surface.

With this, sound measuring device 100c can have smooth reflective surfaces integrally formed as a continuous surface, and thus it is possible to increase the area where the laser beam can be reflected. Accordingly, sound measuring device 100c allows a user to easily design the optical path of the laser beam, and thus it is possible to reduce a loss caused by spillover of the laser beam at the reflective surface.

For example, in sound measuring device 100c according to variation 3, at least one reflective surface 4211 may comprise a plurality of reflective surfaces that differ in orientation from each other in the predetermined space.

With this, sound measuring device 100c can reflect and cross the laser beam in different directions in the predetermined space, and thus it is possible to easily increase the optical path length in the predetermined space.

For example, in sound measuring device 100c according to variation 3, a shape of frame 120c may be a polygon with at least three sides when viewed from the sound propagation direction.

With this, in sound measuring device 100c, the size or shape of the predetermined space, the optical path length of the laser beam, or the like can be appropriately determined according to, for example, the placement area of sound measuring device 100c, the size of the placement area, or the property of sound to be measured, and thus it is possible to more appropriately measure the sound.

For example, in sound measuring device 100c according to variation 3, frame 120c may include at least one reflective component 421, and at least one reflective component 421 may be composed of one reflective component.

With this, sound measuring device 100c can more easily measure the sound. For example, sound measuring device 100c is achieved simply by being provided with frame 120c including one reflective component 421. Accordingly, unlike a frame including two or more reflective components, it is unnecessary to adjust the relative position between the reflective components.

For example, sound measuring device 100c according to variation 3 may further include at least one angle-adjustment reflective component 422 capable of reflecting the laser beam and adjusting a reflection angle of the laser beam.

With this, sound measuring device 100c can adjust the reflection angle of the laser beam to adjust the optical path length of the laser beam.

For example, in sound measuring device 100c according to variation 3, at least one angle-adjustment reflective component 422 may be separate from frame 120c.

With this, sound measuring device 100c can finely adjust the reflection angle of the laser beam to finely adjust the optical path length of the laser beam.

For example, in sound measuring device 100c according to variation 3, at least one angle-adjustment reflective component 422 may be fixed to frame 120c.

With this, sound measuring device 100c can stabilize the reflection angle of the laser beam without shaking. Moreover, the configuration is simplified.

Variation 4

1. Configuration

Figure 12:
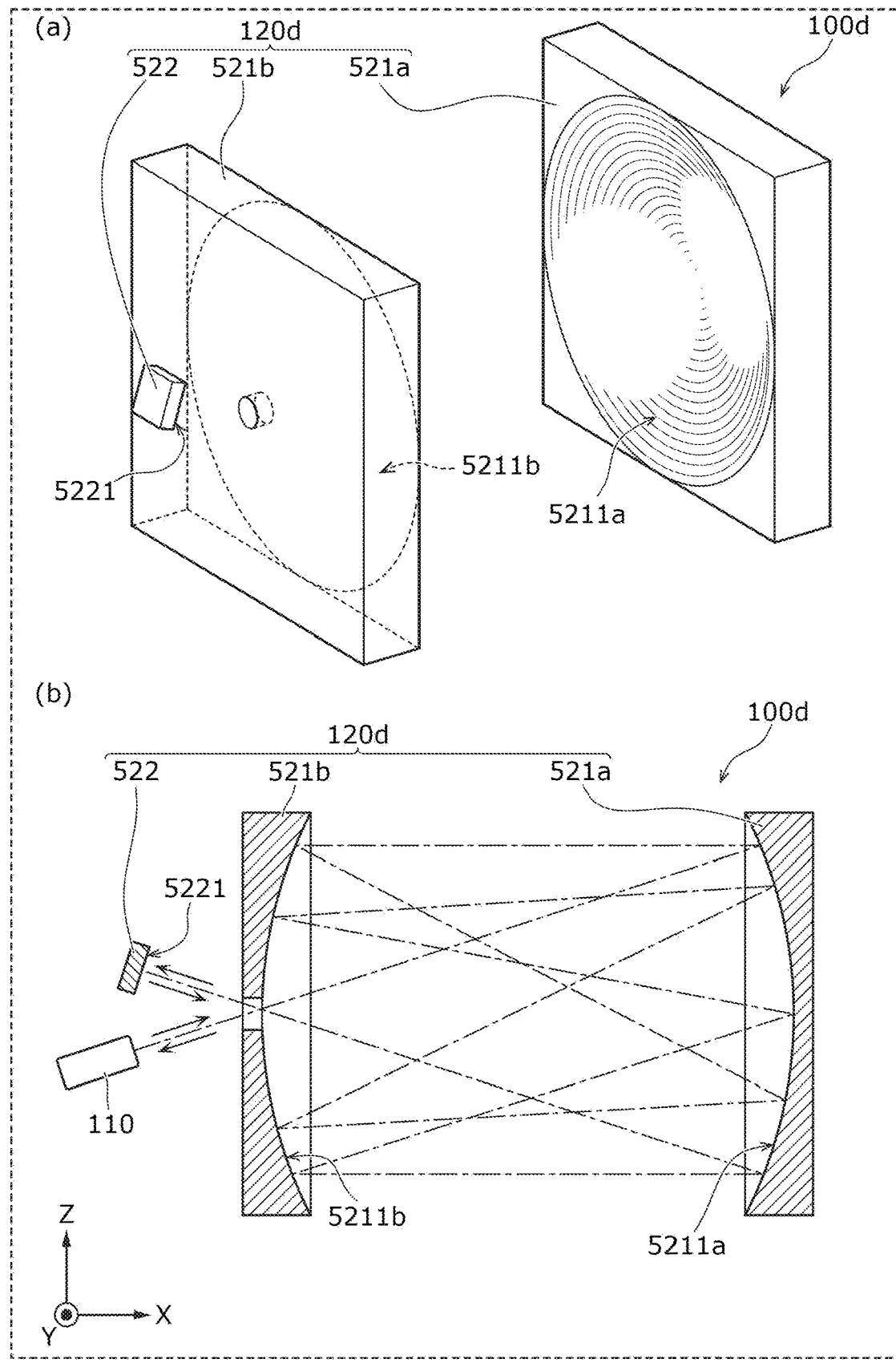
FIG. 12 is a diagram illustrating an example of the configuration of a sound measuring device according to variation 4.

Next, the configuration of a sound measuring device according to variation 4 is described. FIG. 12 is a diagram illustrating an example of the configuration of sound measuring device 100d according to variation 4. Part (a) of FIG. 12 is a perspective view of sound measuring device 100d when viewed from the above, and part (b) of FIG. 12 is a sectional view of frame 120d of sound measuring device 100d shown in part (a) of FIG. 12, taken through the ZX plane.

In the above embodiment and variations 1 to 3, frames 120 to 120c each have at least one planar reflective surface. Variation 4 is different from the embodiment and variations 1 to 3 in that frame 120d has a recessed reflective surface.

Here, the recessed surface includes a recessed surface rounded inward. For example, a concave surface like a bowl is also referred to as a recessed surface.

Two reflective components 521a and 521b each have one reflective surface 5211a and 5211b. These reflective surfaces are each one recessed surface and face the predetermined space. Furthermore, frame 120d includes one angle-adjustment reflective component 522. Angle-adjustment reflective component 522 adjusts the reflection angle of the laser beam at reflective surface 5221 by changing the orientation of reflective surface 5221. In other words, angle-adjustment reflective component 522 is used to return the laser beam back to meter 110.

With the above configuration, sound measuring device 100d according to variation 4 can multiply reflect the laser beam in the predetermined space between reflective components 521a and 521b not only in the ZX plane but also in the sound propagation direction (here, the y-axis direction). Accordingly, it is possible to increase the optical path length also in the depth direction in the predetermined space.

2. Advantageous Effects, Etc.

As described above, sound measuring device 100d according to variation 4 includes: light source 111 that emits a laser beam (see FIG. 4); frame 120d including at least one reflective surface 5211a, 5211b that faces a predetermined space through which sound travels, and transversely surrounds the predetermined space with respect to a sound propagation direction; and light receiver 115 that receives the laser beam multiply reflected by at least one reflective surface 5211a, 5211b (see FIG. 4), in which at least one reflective surface 5211a, 5211b is disposed to multiply reflect and cross the laser beam in the predetermined space as viewed from the sound propagation direction.

With this, sound measuring device 100d can increase the optical path length of the laser beam in the predetermined space, and thus the sound pressure sensitivity is improved.

For example, in sound measuring device 100d according to variation 4, at least one reflective surface 5211a, 5211b may be formed by at least one recessed surface or planar surface.

With this, sound measuring device 100d can easily adjust the optical path length of the laser beam in the predetermined space to a desired length. For example, sound measuring device 100d also can adjust the optical path length of the laser beam and the size of the predetermined space according to the placement area of sound measuring device 100d, the size of the placement area, or the property (e.g., the frequency, or the sound pressure) of sound to be measured.

For example, in sound measuring device 100d according to variation 4, at least one reflective surface 5211a, 5211b may be integrally formed as a continuous surface.

With this, sound measuring device 100d can have smooth reflective surfaces integrally formed as a continuous surface, and thus it is possible to increase the area where the laser beam can be reflected. Accordingly, sound measuring device 100d allows a user to easily design the optical path of the laser beam, and thus it is possible to reduce a loss caused by spillover of the laser beam at the reflective surface.

For example, in sound measuring device 100d according to variation 4, frame 120d may include at least one reflective component 521a, 521b, at least one reflective component 521a, 521b may comprise a plurality of reflective components, and reflective components 521a, 521b may be away from each other.

With this, sound measuring device 100d can easily adjust the placement angles of reflective components 521a and 521b. Accordingly, sound measuring device 100d can easily adjust the optical path length of the laser beam in the predetermined space.

For example, sound measuring device 100d according to variation 4 may further include at least one angle-adjustment reflective component 522 capable of reflecting the laser beam and adjusting a reflection angle of the laser beam.

With this, sound measuring device 100d can adjust the reflection angle of the laser beam to adjust the optical path length of the laser beam.

For example, in sound measuring device 100d according to variation 4, at least one angle-adjustment reflective component 522 may be separate from frame 120d.

With this, sound measuring device 100d can finely adjust the reflection angle of the laser beam to finely adjust the optical path length of the laser beam.

For example, in sound measuring device 100d according to variation 4, at least one angle-adjustment reflective component 522 may be fixed to frame 120d.

With this, sound measuring device 100d can stabilize the reflection angle of the laser beam without shaking. Moreover, the configuration is simplified.

Variation 5

1. Configuration

Figure 13:
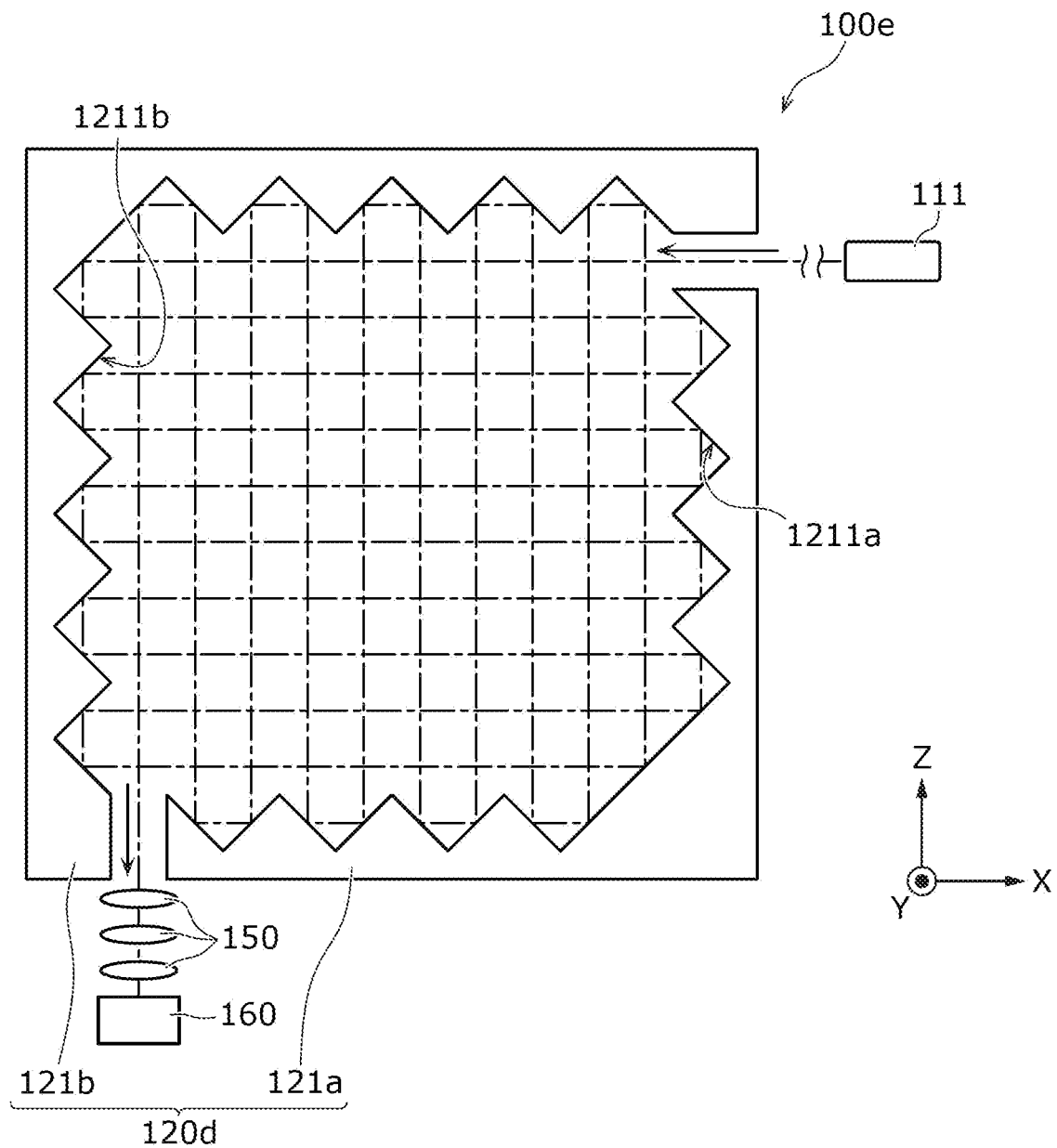
FIG. 13 is a diagram illustrating an example of the configuration of a sound measuring device according to variation 5.

Next, the configuration of a sound measuring device according to variation 5 is described. FIG. 13 is a diagram illustrating an example of the configuration of sound measuring device 100e according to variation 5.

In the above embodiment and variations 1 to 4, the laser beam emitted from meter 110 to the predetermined space is returned back to meter 110. Variation 5 is different from the embodiment and variations 1 to 4 in that the laser beam is incident on light detector 160 instead of returning the laser beam back to meter 110.

Sound measuring device 100e according to variation 5 includes light source 111, frame 120d, condenser lens 150, and light detector 160. Light detector 160 is, for example, a photo diode. Frame 120d of variation 5 is different from frame 120a of the embodiment in that there is no angle-adjustment reflective component 122.

With this, sound measuring device 100e according to variation 5 can increase the optical path length, and thus the sound pressure sensitivity is improved. Moreover, unlike the sound measuring devices according to the embodiment and variations 1 to 4, sound measuring device 100e need not return the laser beam back to the meter, and thus it is possible to more easily measure the sound.

Other Embodiments

The sound measuring devices according to one or more aspects of the present disclosure have been described based on the above embodiment and variations, but the present disclosure is not limited to the above embodiment and variations. Various modifications to the embodiment that can be conceived by those skilled in the art and forms configured by combining different components in the embodiment without departing from the spirit of the present disclosure may be included in the scope of one or more aspects of the present disclosure.

For example, the directivity of the sound measuring device may be adjusted by changing the ratio between the horizontal width and the vertical width of the frame as viewed from the sound propagation direction. With this, the sound measuring device can reduce noise, and thus it is possible to improve the measurement accuracy of sound.

Moreover, for example, the directivity of the sound measuring device may be adjusted to differ between the horizontal direction and the vertical direction by increasing at least one of the horizontal width or the vertical width of the frame as viewed from the sound propagation direction. With this, the sound measuring device can freely adjust the directivity according to sound to be measured, and thus it is possible to improve the measurement accuracy of sound.

Figure 14:
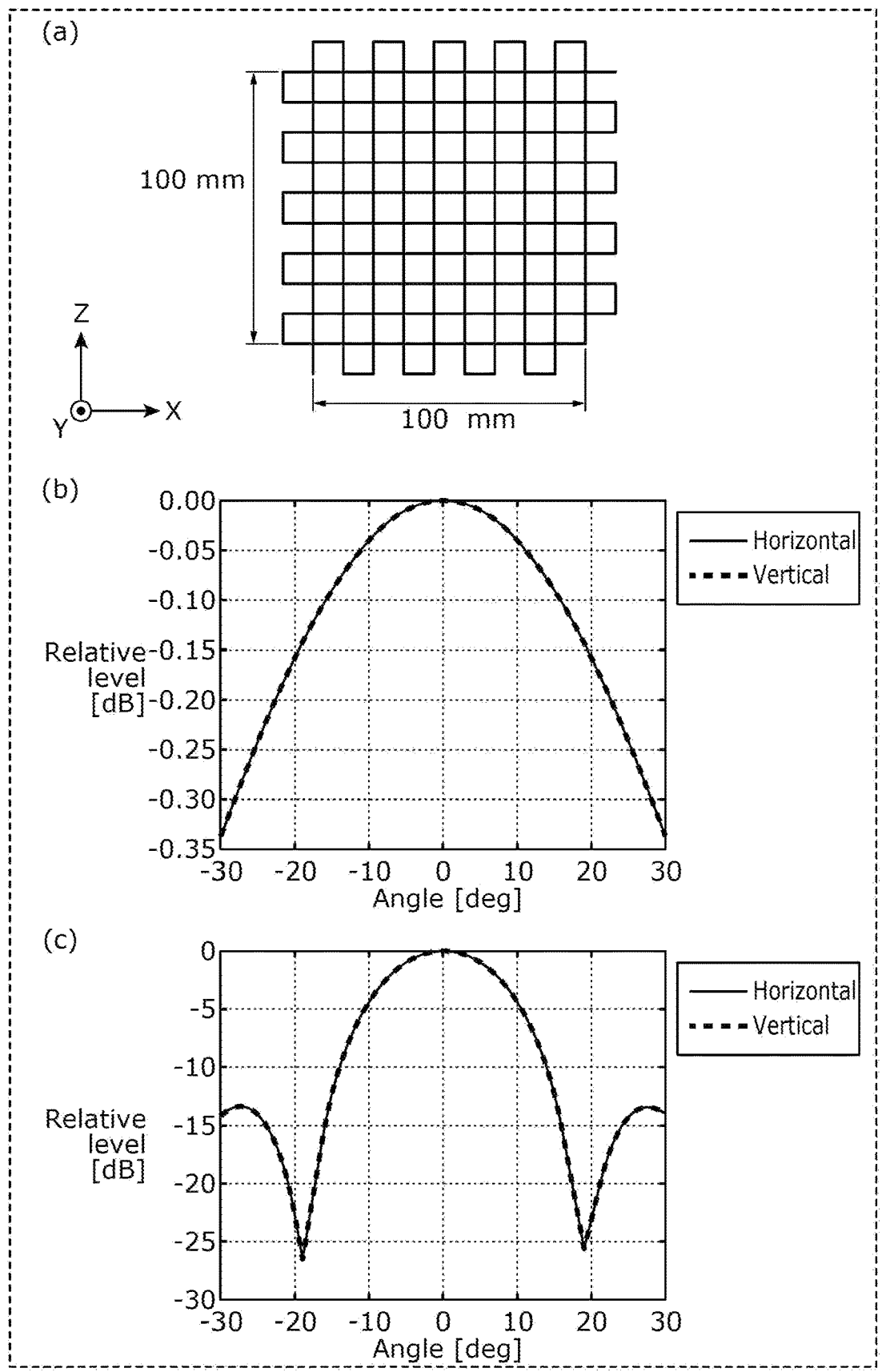
FIG. 14 is a diagram illustrating example 1 of the relationship between directivity of the sound measuring device and a ratio between the horizontal width and the vertical width of the frame when viewed from a sound propagation direction.
Figure 15:
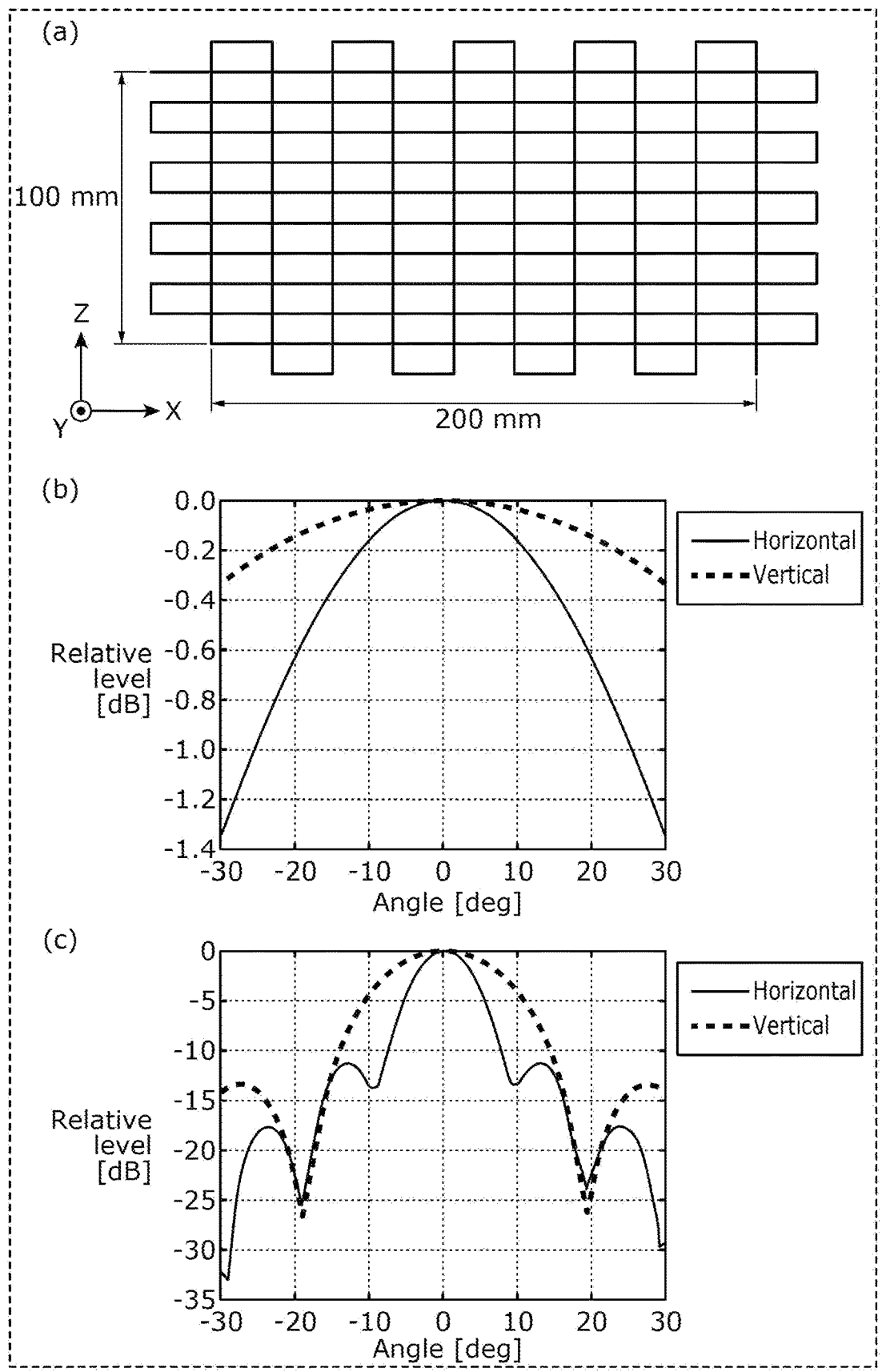
FIG. 15 is a diagram illustrating example 2 of the relationship between the directivity of the sound measuring device and the ratio between the horizontal width and the vertical width of the frame when viewed from a sound propagation direction.

The following describes in detail the relationship between directivity of the sound measuring device and a ratio between the horizontal width and the vertical width of the frame, with reference to FIG. 14 and FIG. 15.

Example 1

Example 1 describes the case where the ratio between the horizontal width and the vertical width of the frame is 1:1. FIG. 14 is a diagram illustrating example 1 of the relationship between the directivity of the sound measuring device and the ratio between the horizontal width and the vertical width of the frame when viewed from the sound propagation direction. In FIG. 14, sound measuring device 100 shown in FIG. 2 is used, but frame 120 is omitted in terms of visibility.

Part (a) of FIG. 14 illustrates a sound receiver when frame 120 is viewed from the sound propagation direction. The sound receiver receives sound traveling through the predetermined space by multiply reflecting the laser beam in the predetermined space surrounded by frame 120. For example, the sound receiver can be regarded as a microphone array in which multiple microphones are arranged along the optical path of the multiply reflected laser beam. More specifically, in part (a) of FIG. 14, the optical path of the laser beam multiply reflected in the predetermined space as viewed from the sound propagation direction is denoted by the solid line.

In example 1, frame 120 is placed at a distance of 1 m from a sound source. The sound source and the center of the sound receiver when viewed from the sound propagation direction (more specifically, a surface on the sound-source side of the sound receiver, i.e., a sound receiving surface) are aligned. Hereinafter, a line passing through the sound source and the center of the sound receiver is referred to as a principal axis.

Part (b) of FIG. 14 is a graph illustrating the directivity of the sound measuring device when the frequency of measured sound is 1 kHz. Part (c) of FIG. 14 is a graph illustrating the directivity of the sound measuring device when the frequency of measured sound is 10 kHz. In parts (b) and (c) of FIG. 14, the horizontal axis denotes an angle (deg.), and the vertical axis denotes a difference (i.e., a relative level) between the sound pressure measured on the principal axis (angle=0°) in the sound receiver and the sound pressure measured at each angle.

As shown in parts (b) and (c) of FIG. 14, it is confirmed that the directivity symmetrical with respect to the principal axis is formed in the sound receiver.

Example 2

Example 2 describes the case where the ratio between the horizontal width and the vertical width of the frame is 2:1. FIG. 15 is a diagram illustrating example 2 of the relationship between the directivity of the sound measuring device and the ratio between the horizontal width and the vertical width of the frame when viewed from the sound propagation direction. Also in FIG. 15, the frame is omitted in terms of visibility.

Part (a) of FIG. 15 illustrates a sound receiver when viewed from the sound propagation direction. The sound receiver has been described above, and thus its description is omitted here. In part (a) of FIG. 15, the optical path of the laser beam multiply reflected in the predetermined space as viewed from the sound propagation direction is denoted by the solid line.

Also in example 2, the frame is placed at a distance of 1 m from a sound source.

Part (b) of FIG. 15 is a graph illustrating the directivity of the sound measuring device when the frequency of measured sound is 1 kHz. Part (c) of FIG. 15 is a graph illustrating the directivity of the sound measuring device when the frequency of measured sound is 10 kHz. In parts (b) and (c) of FIG. 15, the horizontal axis denotes an angle (deg.), and the vertical axis denotes a difference (i.e., a relative level) between the sound pressure measured on the principal axis (angle=0°) in the sound receiver and the sound pressure measured at each angle.

As shown in parts (b) and (c) of FIG. 15, it is confirmed that the directivity symmetrical with respect to the principal axis is formed in the sound receiver. Furthermore, when the horizontal width of the sound receiver is wider than the vertical width, it is confirmed that the directivity of sound measured in the horizontal direction is higher than that of sound measured in the vertical direction in the sound receiver.

As described above, aspects described in example 1 and example 2 also may be included in the sound measuring device according to one or more aspects of the present disclosure.

Moreover, one aspect of the present disclosure may be not only such a sound measuring device but also a sound measurement method including steps corresponding distinctive components included in the sound measuring device. Moreover, one aspect of the present disclosure may be a computer program for causing a computer to execute each of distinctive steps included in the sound measurement method. Moreover, one aspect of the present disclosure may a computer-readable non-transitory recording medium that stores such a computer program.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

According to the present disclosure, the mechanical vibration of a diaphragm is not used, and thus sound in a wider frequency band, especially ultrasonic sound, can be measured. Accordingly, the ultrasonic sound is measured and thereby the present disclosure is applicable to early detection or prediction of a failure in a device or the like, and estimation of human behavior or the like.

The invention claimed is:
1. A sound measuring device comprising:
   a light source that emits a laser beam;
   a frame including at least one reflective surface that faces a predetermined space and transversely surrounds the predetermined space with respect to a sound propagation direction, the predetermined space being a space through which sound travels; and
   a light receiver that receives the laser beam multiply reflected by the at least one reflective surface, wherein the at least one reflective surface is disposed to multiply reflect and cross the laser beam in the predetermined space as viewed from the sound propagation direction, and the at least one reflective surface includes recesses and protrusions.

2. The sound measuring device according to claim 1, wherein the at least one reflective surface is integrally formed as a continuous surface.

3. The sound measuring device according to claim 1, wherein the at least one reflective surface comprises a plurality of reflective surfaces that differ in orientation from each other in the predetermined space.

4. The sound measuring device according to claim 1, wherein a shape of the frame is a polygon with at least three sides when viewed from the sound propagation direction.

5. The sound measuring device according to claim 4, wherein the polygon is a triangle, a quadrilateral, a pentagon, or a hexagon.

6. The sound measuring device according to claim 1, wherein the frame includes at least one reflective component, the at least one reflective component comprises a plurality of reflective components, and the plurality of reflective components are away from each other.

7. The sound measuring device according to claim 1, wherein the frame includes at least one reflective component, and the at least one reflective component is composed of one reflective component.

8. The sound measuring device according to claim 1, further comprising:

a collimating lens, wherein the light source emits the laser beam to the predetermined space through the collimating lens.

9. The sound measuring device according to claim 1, further comprising:

at least one angle-adjustment reflective component capable of reflecting the laser beam and adjusting a reflection angle of the laser beam.

10. The sound measuring device according to claim 9, wherein the at least one angle-adjustment reflective component is separate from the frame.

11. The sound measuring device according to claim 9, wherein the at least one angle-adjustment reflective component is fixed to the frame.

12. The sound measuring device according to claim 1, wherein directivity of the sound measuring device is adjusted by changing a ratio between a horizontal width of the frame and a vertical width of the frame as viewed from the sound propagation direction.

13. The sound measuring device according to claim 1, wherein directivity of the sound measuring device is adjusted to differ between a horizontal direction and a vertical direction by increasing at least one of a horizontal width of the frame or a vertical width of the frame as viewed from the sound propagation direction.

* * * * *